(12) United States Patent
Krishnaswamy et al.

(10) Patent No.: US 8,913,587 B2
(45) Date of Patent: Dec. 16, 2014

(54) INFRASTRUCTURE-UNASSISTED INTER-DEVICE WIRELESS WIDE AREA NETWORK HANDOFF

(75) Inventors: Dilip Krishnaswamy, San Diego, CA (US); Parvathanathan Subrahmanya, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 772 days.

(21) Appl. No.: 13/111,114

(22) Filed: May 19, 2011

(65) Prior Publication Data

US 2012/0294275 A1    Nov. 22, 2012

(51) Int. Cl.
| | | |
|---|---|---|
| *H04W 4/00* | (2009.01) | |
| *G08C 17/00* | (2006.01) | |
| *H04W 36/00* | (2009.01) | |
| *H04M 1/00* | (2006.01) | |
| *H04W 84/00* | (2009.01) | |
| *H04W 8/26* | (2009.01) | |
| *H04W 88/04* | (2009.01) | |
| *H04W 88/02* | (2009.01) | |
| *H04W 88/06* | (2009.01) | |

(52) U.S. Cl.
CPC ............ *H04W 36/00* (2013.01); *H04M 1/006* (2013.01); *H04W 84/005* (2013.01); *H04W 8/26* (2013.01); *H04W 88/04* (2013.01); *H04W 88/02* (2013.01); *H04W 88/06* (2013.01)
USPC ......................................... 370/331; 370/311

(58) Field of Classification Search
CPC .................................................... H04W 36/00
USPC ............................................................ 370/331
See application file for complete search history.

(56) References Cited

U.S. PATENT DOCUMENTS

| | | | |
|---|---|---|---|
| 2003/0224840 | A1 | 12/2003 | Frank et al. |
| 2004/0042442 | A1 | 3/2004 | Pecen et al. |
| 2005/0059430 | A1* | 3/2005 | Beeman et al. ............... 455/558 |
| 2006/0166695 | A1 | 7/2006 | Morich |
| 2006/0217116 | A1* | 9/2006 | Cassett et al. ................. 455/423 |
| 2007/0275746 | A1* | 11/2007 | Bitran .......................... 455/509 |
| 2008/0108338 | A1* | 5/2008 | Herrero Veron et al. .. 455/414.3 |
| 2008/0198811 | A1* | 8/2008 | Deshpande et al. .......... 370/332 |
| 2008/0316966 | A1* | 12/2008 | Joshi et al. .................... 370/330 |

(Continued)

FOREIGN PATENT DOCUMENTS

| | | | |
|---|---|---|---|
| EP | 1178693 | A1 | 2/2002 |
| EP | 1737188 | A2 | 12/2006 |
| EP | 1814295 | A1 | 8/2007 |
| WO | 2004002176 | A1 | 12/2003 |

OTHER PUBLICATIONS

International Search Report and Written Opinion—PCT/US2012/038223—ISA/EPO—Aug. 13, 2012.

*Primary Examiner* — Gerald Smarth
(74) *Attorney, Agent, or Firm* — Jeffrey D. Jacobs

(57) ABSTRACT

Aspects describe infrastructure unassisted inter-device handoff. A method performed by a wireless communications apparatus for inter-device handoff is disclosed. A wireless communications apparatus that performs a network unassisted inter-device handoff is disclosed. A computer program product comprising a computer-readable medium that includes codes for carrying out inter-device handoff is disclosed. At least one processor configured to perform a network unassisted communication handoff is disclosed.

38 Claims, 12 Drawing Sheets

(56) References Cited

U.S. PATENT DOCUMENTS

| | | | |
|---|---|---|---|
| 2010/0190447 A1* | 7/2010 | Agrawal et al. | 455/63.1 |
| 2010/0191612 A1* | 7/2010 | Raleigh | 705/26 |
| 2011/0151864 A1* | 6/2011 | Byun et al. | 455/426.1 |
| 2011/0153805 A1* | 6/2011 | Beninghaus et al. | 709/224 |
| 2011/0249658 A1* | 10/2011 | Wohlert et al. | 370/338 |
| 2011/0286387 A1* | 11/2011 | Sane et al. | 370/328 |
| 2012/0099496 A1* | 4/2012 | Klein | 370/311 |
| 2012/0099566 A1* | 4/2012 | Laine et al. | 370/338 |

\* cited by examiner

INFRASTRUCTURE-UNASSISTED INTER-DEVICE WIRELESS WIDE AREA NETWORK HANDOFF

BACKGROUND

1. Field

The following description relates generally to wireless communications and more particularly to shared wireless wide area network modems.

2. Background

Wireless communication systems are widely deployed to provide various types of communication content, such as voice, data, video, and so forth, and to communicate information regardless of where a user is located (e.g., inside or outside a structure) and whether a user is stationary or moving (e.g., in a vehicle, walking). These systems may be multiple-access systems capable of supporting communication with multiple users by sharing the available systems resources (e.g., bandwidth and transmit power). Multiple-access systems include Frequency Division Multiple Access (FDMA) systems, Time Division Multiple Access (TDMA) systems, Code Division Multiple Access (CDMA) systems, Orthogonal Frequency Division Multiple Access (OFDMA) systems, Third Generation Partnership Project (3GPP) Long Term Evolution (LTE) systems, and others.

Generally, wireless multiple-access communication systems can simultaneously support communication for multiple mobile (e.g., wireless) devices (or mobile terminals). Each mobile device can communicate with one or more base stations through transmissions on forward and reverse links. The forward link (or downlink) refers to the communication link from base stations to mobile devices. The reverse link (or uplink) refers to the communication link from mobile devices to base stations. These communication links can be established through single-input-single-output (SISO) systems, multiple-input-single-output (MISO) systems, multiple-input-multiple-output (MIMO) systems, and so forth. In addition, mobile devices can communicate with other mobile devices (and/or base stations with other base stations) in peer-to-peer wireless network configurations.

A typical wireless communication network (e.g., employing frequency, time, and code division techniques) includes one or more base stations that provide a coverage area and one or more mobile devices that can transmit and receive data within the coverage area. A typical base station can concurrently transmit multiple data streams for broadcast, multicast, and/or unicast services, wherein a data stream is a stream of data that can be of independent reception interest to a mobile device. A mobile device within the coverage area of that base station can be interested in receiving one, more than one, or all data streams carried by the composite stream. Likewise, a mobile device can transmit data to the base station or another mobile device.

When a user desires to communicate over a network, that user operates a device and a modem of the device is utilized to perform the communication functions. However, this can consume the device's energy, which can become a concern especially if the user is not near a power source. Further, at times a quality of the device's link might be low, resulting in signal degradation, which can negatively affect the user's communication experience.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with shared wireless wide area network modems, which can conserve energy for networks, nodes, or both networks and nodes. Further, modem sharing can improve network resource utilization and can improve wireless wide area network link performance.

According to an aspect is a method for inter-device handoff. Method comprises determining a communication is to be handed off from a first wireless communications device and selecting a second communications device from a plurality of communications devices to which the communication is to be handed off. Method also comprises observing a synchronization period phase and transferring information to second communications device. Method also includes using a common identity associated with a wireless wide area network (WWAN) for first communications device and second communications device. Method also includes handing off the communication to second communications device. First wireless communications device comprises a first WWAN modem and second wireless communications devices comprise a second WWAN modem. First WWAN modem or second WWAN modem is used for communication with a WWAN. The WWAN does not assist with the handing off.

Another aspect relates to a wireless communications apparatus comprising a memory and a processor. Memory retains instructions related to deciding to transfer a communication to a selected node, conveying information to selected node during a synchronization period, and attempting a handoff of a least one function to selected node. Selected node comprises a WWAN modem for communication with a WWAN. A common identity is used by the selected node to communicate with the WWAN. The WWAN does not assist with the handoff. Processor is coupled to memory and is configured to execute instructions retained in memory.

A further aspect relates to a wireless communications apparatus that performs a network unassisted inter-device handoff. Wireless communications apparatus comprises means for deciding to transfer at least one function to a node and means for selecting the node for the transfer. The node comprises a WWAN modem for communication with a WWAN. Wireless communications apparatus comprises means for transferring to the node common identity information and information related to the at least one function and means for determining the at least one function is successfully handed off to the node. The WWAN does not assist with the handoff.

In an aspect, wireless communications apparatus comprises means for starting a timer after the means for deciding determines the at least one function is to be transferred and means for discontinuing the transfer if the timer expires before the at least one function is successfully handed off to the node. According to an aspect, wireless communications apparatus comprises means for suspending a network communication and means for resuming the network communication if the at least one function is not successfully handed off to the node.

According to an aspect is a computer program product comprising a computer-readable medium. Computer-readable medium comprises a first set of codes for causing a computer to decide to transfer a communication and a second set of codes for causing computer to select a node for communication transfer. The node comprises a WWAN modem. Computer-readable medium comprises a third set of codes for causing computer to discontinue a network communication, a fourth set of codes for causing computer to convey information to the node, and a fifth set of codes for causing computer to release the communication to the node. The information conveyed can comprise at least one common identity. The communication is released without assistance from the network.

An aspect relates to at least one processor configured to perform a network unassisted communication handoff. Processor comprises a first module that determines a communication is to be handed off, a second module that selects a node from a plurality of nodes to which the communication is to be handed off, wherein the node comprises a wireless wide area network (WWAN) modem used for communications with a WWAN. Also included is a third module that starts a call drop timer that has a duration that is less than a network call drop time. Processor includes a fourth module that observes a silence period phase and a fifth module that transfers information to the node. Also included is a sixth module that hands off the communication to the node. The WWAN does not assist with the hand off. The silence period phase continues until expiration of call drop timer or until the communication is successfully handed off to the node.

To the accomplishment of the foregoing and related ends, one or more aspects comprise features hereinafter fully described and particularly pointed out in the claims. The following description and annexed drawings set forth in detail certain illustrative features of one or more aspects. These features are indicative, however, of but a few of various ways in which principles of various aspects may be employed. Other advantages and novel features will become apparent from the following detailed description when considered in conjunction with the drawings and the disclosed aspects are intended to include all such aspects and their equivalents.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing these aspects.

Figure 1:
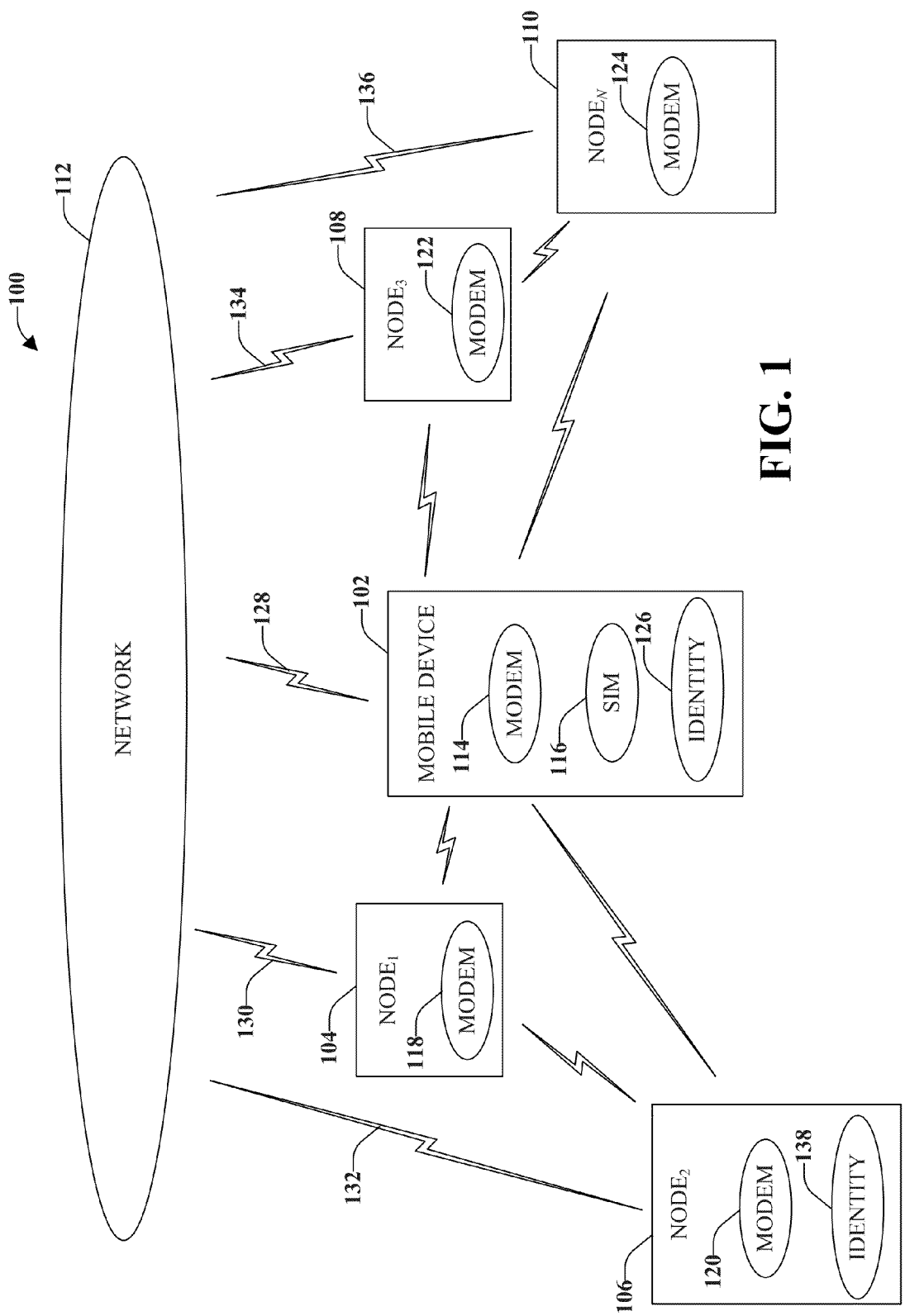
FIG. 1 illustrates a system that supports inter-device handoff, according to an aspect.

With reference to FIG. 1, illustrated is a system 100 that supports inter-device handoff, according to an aspect. In an example, inter-device handoff can occur when a person is using a mobile device, such as a phone, to communicate (e.g., voice call, data call, an application, such as a social network, email, a browser and so forth) while walking from an office building to the person's vehicle. As the person (and mobile device) approach the vehicle (or at about the same time as a vehicle engine is started), the communication can be dynamically transferred from mobile device to a vehicle modem. Using vehicle modem can be beneficial because an antenna associated with vehicle modem can be located external to vehicle and, therefore, will not suffer (significant) signal losses due to the need to penetrate the vehicle body, which can be the case for mobile device. Further, using vehicle modem can conserve energy (and battery power) of mobile device. In a similar manner, if the person has reached her destination and vehicle modem is processing the communication, as the person leaves the vehicle (or at about the same time as the vehicle engine is turned off), the communication can be dynamically transferred from vehicle modem to mobile device (or to another device). It should be understood that although various aspects are explained herein with reference to a car modem and/or a particular mobile device, the disclosed aspects are not limited to this embodiment.

In an aspect, inter-device handoff is network unassisted where the handoff is facilitated between the nodes with the network. Furthermore, the handoff can be network unaware handoff or network aware handoff. For network aware inter-device handoff, network (or base station) is aware of the identity of nodes involved in the handoff. The nodes can send additional signaling information to the network indicating the initiation and/or completion of the hand off. The signaling information can include a device identity associated with each node. The device identities for the nodes are separate from the common identity being used by the nodes to communicate. For network unaware inter-device handoff, network is not aware that the node (e.g., device) has changed (e.g., that there has been a handoff) and that network is talking to a different device.

The common identity can be based on a SIM (Subscriber Identification Module) card, a UICC (Universal Integrated Circuit Card), or a software VSIM (software Virtual SIM). For network awareness, device identifier can be an IMEI (International Mobile Equipment Identity) that is exchanged during signaling before and/or after completion of handoff to make the network aware of the handoff.

Handoff for network unassisted inter-device handoff is facilitated between nodes without involvement from network. For example, a single identity can be utilized by the various nodes involved in the inter-device handoff such that the network is not aware (and does not need to be aware) of the actual node with which it is in communication. System 100 is configured to support both network unassisted inter-device handoff and network assisted handoff.

Included in system 100 are a mobile device 102 and a multitude of other devices or nodes, illustrated as node₁ 104, node₂ 106, node₃, 108, through node$_N$ 110, where N is an integer. Mobile device 102 and nodes 104, 106, 108, 110 can be various types of communication devices (e.g., laptop computer, desktop computer, personal digital assistant (PDA), tablet, mobile phone, and so on) and/or modems (e.g., car modem, wall plug unit modem, and so forth). Mobile device 102 and nodes 104, 106, 108, 110 can be in various locations and do not need to be at a same location. For example, one or more nodes 104, 106, 108, 110 can be in a vehicle operating as a modem (integrated or after-market device), by a home desk (e.g., user's laptop, wall-plugged unit, and so forth), by a work desk (e.g., user's laptop, wall-plugged unit, and so on), carried by a user that is walking or is at a meeting (e.g., user's laptop, wall-plugged unit, and so on), as well as in other locations. Further, each node 104, 106, 108, 110 can handoff to/from another node and/or to/from mobile device 102.

Mobile device 102 and nodes 104, 106, 108, 110 can be configured to discover each other and/or can be associated with each other. For example, a single user or a group of users (e.g., family, friends, work group, and so on) may have multiple devices or modems (e.g., mobile device 102, nodes 104, 106, 108, 110) through which one or more users can interact with network 112 (which can be a wireless wide area network (WWAN)). Mobile device 102 includes a wireless wide area network (WWAN) modem 114 and a subscriber identity modem (SIM) Card 116. Each node 104, 106, 108, 110 includes a respective WWAN modem 118, 120, 122, 124.

When a communication is terminated or originated at mobile device 102, a direct link 128 with network 112 is established. At some time during the communication, it might be determined by mobile device 102 (or a node) that the communication is to be handed off to a node 104, 106, 108, 110 (or back to mobile device from a node). After handoff to a node, an indirect link 130, 132, 134, 136 to network 112 is utilized for the communication. If the communication is transferred back (handed off) to mobile device, direct link 128 is once again used. For example, if a node is a car modem and the user walks away from the car, the communication is handed off from the node to the mobile device.

Mobile device 102 and nodes 104, 106, 108, 110 are able to communicate with each other over peer-to-peer wireless links that may use a radio protocol (e.g., BlueTooth®, Ultra-Wide Band (UWB), Wireless Local Area Network (WLAN), FlashLinQ®, and so forth) other than WWAN protocol used for WWAN connectivity. For example, the discovery can be over a short-range peer-to-peer link, either wired (e.g., Universal Serial Bus (USB) dock) or wireless (e.g., WiFi Direct (range of around 100 meters) or Bluetooth® (range of about 3 to 10 meters)), wherein the discovery can occur between devices/nodes in different rooms or different areas.

As mobile device 102 is operated and moved, mobile device 102 can attempt to locate a trusted communicator proxy node (e.g., one or more nodes 104, 106, 108, 110) whenever possible and offload mobile device WWAN communications to that trusted communicator proxy node to the extent possible (e.g., to conserve resources on mobile device). Thus, mobile device 102 can be in a Bluetooth® sniff mode (for example) for at least part of the time.

There might be times when it would be advantageous for a communication to occur through mobile device 102 or through one of the other nodes 104, 106, 108, 110. For example, in a car, there can be a car modem (e.g., node 104), wherein antennas for communication with car modem are located outside the car and should not suffer (major) penetration losses through the car. However, if mobile device 102 is inside the car, direct link 128 can suffer signal degradation since signals have to penetrate though the car. Thus, if one of the nodes 104, 106, 108, 110 includes antennas outside the car, it might be beneficial to use that node for communication since that node might have a better link and, therefore, can communicate faster to network 112 (or a base station) and use less resources and energy because of the faster communication.

Continuing the above example, the user is in her home and is engaged in a voice call (data call or utilizing one or more applications) using mobile device 102. That user has to leave for work and walks to her car while carrying her mobile device 102. As approaching the car and/or at substantially the same time as the car engine is started, a car modem detects the presence of mobile device 102 and mobile device 102 detects the presence of car modem. In this case, since the car modem antennas should provide better reception for the voice call, mobile device 102 can selectively transfer (handoff) the voice call to car modem. In a similar manner, if the user has arrived at work and desires to continue the voice call, as the user walks away from the car and/or at about the same time as the car ignition is turned off, the voice call can be transferred from car modem to mobile device (or to another node).

In accordance with some aspects, mobile device 102 and/or one or more nodes 104, 106, 108, 110 can automatically decide to handoff to each other (e.g., mobile device 102 to/from a node 104, 106, 108, 110; one node to another node, and so forth). This decision can be based on various criteria including an energy consumption mitigation of mobile device 102, strength of connection with network 112, a node energy level, and an amount of energy that will be consumed by the node while communicating with network 112.

According to some aspects, a communicator proxy node (e.g., nodes 104, 106, 108, 110) can handle the entire WWAN stack to conserve energy related to WWAN processing at mobile device 102. Communicator proxy node can handle all WWAN connectivity, mobility, and network management. Additionally, communicator proxy node can respond and handle all circuit switched (CS) voice calls (e.g., does not involve mobile device 102 for CS voice calls). Communicator proxy can transfer data traffic over short-range link with mobile device 102. Further, communicator proxy node can have the ability to handoff CS calls to mobile device.

In order to selectively transfer communications between mobile device 102 and a node 104, 106, 108, 110, a mobile device identity 126 can be communicated to nodes 104, 106, 108, 110. Nodes can use mobile device identity 126 to continue the communication with network 112 (e.g., network 112 is not aware device/node performing the communication has changed (for network unassisted mode)). According to some aspects, at least one node 106 can comprise an identity 138 that has a first set of services. The identity 138 can be utilized by node 106 and responsibility of a second set of services, associated with identity 126, can be assumed by node after handoff to node 106.

In accordance with some aspects, modems are connected over wireless link, as illustrated. According to some aspects, a subset of modems are wired connected. In some aspects, a subset of modems are integrated on platforms (different modems on the same platform or on different platforms).

Figure 2:
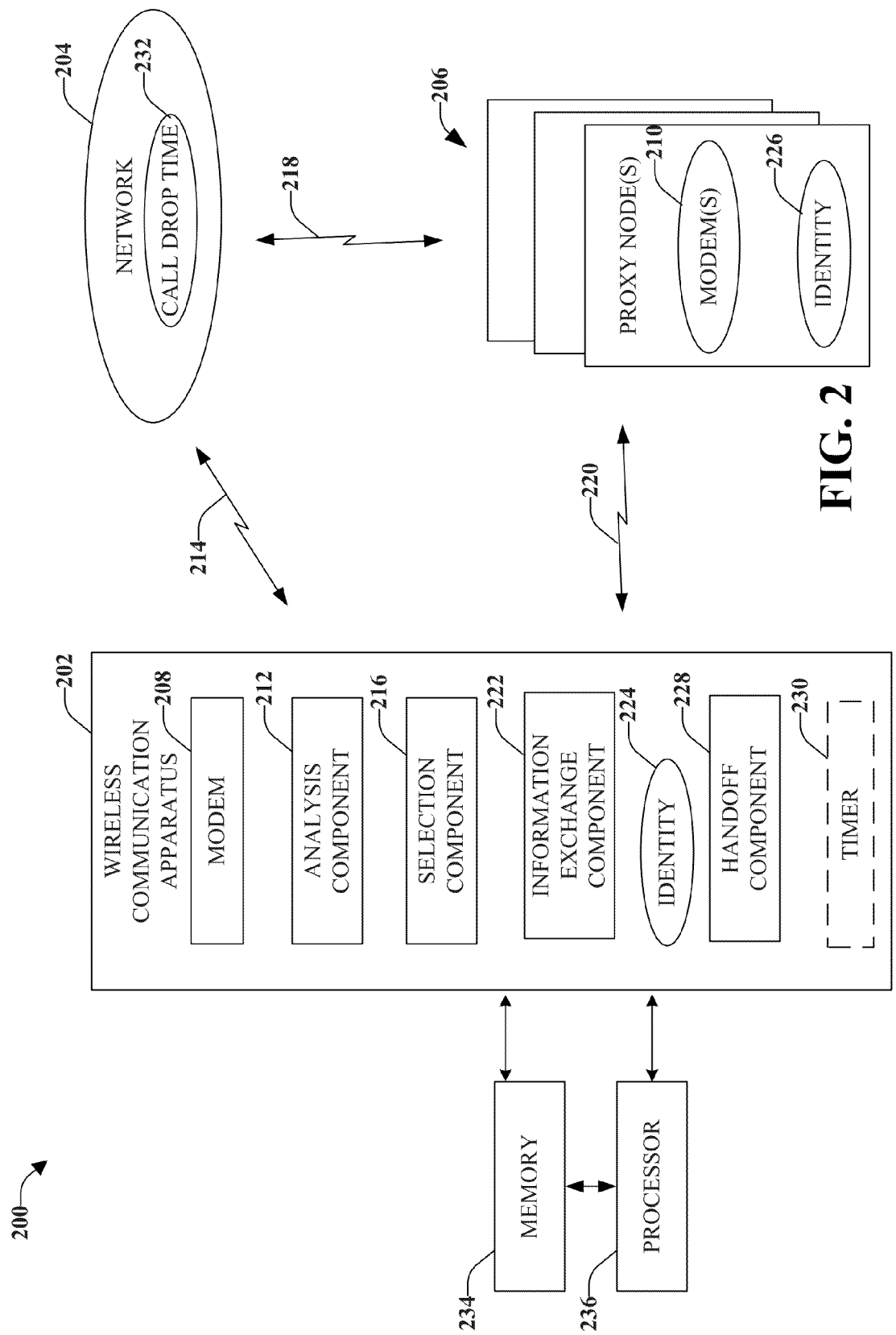
FIG. 2 illustrates a system that supports infrastructure unassisted inter-device handoff, according to an aspect.

FIG. 2 illustrates a system 200 that supports infrastructure unassisted inter-device handoff, according to an aspect. System 200 can be implemented in a wireless communications network. Included in system 200 is a wireless communications apparatus 202. Wireless communications apparatus 202 can be any device or node that can be utilized for communication (e.g., mobile device 102 and/or nodes 104, 106, 108, 110 of FIG. 1).

Wireless communications apparatus 202 (e.g., a primary device) can handoff a communication, an application, or other functions, to another node or device (referred to as a proxy node) and/or receive a communication, an application, or one or more functions, that has been handed off from another node (or device). In accordance with some aspects, wireless communications apparatus 202 can be configured to handoff communications and/or one or more functions without assistance from a network 204. Without network 204 assistance, the handoff is referred to as "infrastructure unassisted mode". The term "infrastructure assisted mode" (or "network assisted mode") refers to the situation when there is assistance from network 204 for handoff.

Network unassisted mode (or without network assistance) is utilized to indicate that the responsibility for reception and transmission of the WWAN resides with one of the devices (or nodes) that comprises a WWAN modem, such that network has no knowledge of the specific device/node communicating with network. According to an aspect, devices/nodes share an identity such that communication is facilitated by one device/node at a time. If data applications are supported, all devices/nodes utilize the same IP address, such that applications can terminate on any device/node. Application level synchronization should occur before handoff in order to restore the state of applications.

According to some aspects, a voice call is transferred without network assistance. In some aspects, a data call is transferred without network assistance. In other aspects, a voice call is transferred but a data call is terminated. In an alternate aspect, a data call is transferred but a voice call is terminated. In yet another aspect, applications (e.g., social network, instant messaging, and so forth) are transferred without network assistance. In order to handoff or transfer an ongoing communication/function(s), an association between wireless communications apparatus 202 and one or more proxy nodes 206 is established. This association can be established formally such that wireless communications apparatus 202 and at least a subset of proxy nodes 206 are aware of the identity of each other and/or that a person (or a group of people) are in possession of the devices (e.g., a single person (or group of people) owns all the devices/nodes and has authorization to use the devices/nodes). In accordance with some aspects, the association can be established informally. In this case wireless communications apparatus 202 is configured to discover at least a subset of proxy nodes 206. Each proxy node in the subset of proxy nodes 206 can broadcast (or convey in another manner) that the proxy node is available to communicate on behalf of another device, such as wireless communications apparatus 202. Wireless communications apparatus 202 includes a modem 208 and each of the proxy nodes 206 includes a modem 210.

During a communication (or at other times), wireless communications apparatus 202 can determine that communications should no longer be handled by wireless communications apparatus 202. It can be determined that communications should be handled by a proxy node selected from the plurality of proxy nodes 206. For example, an analysis component 212 can review various criteria to determine whether a handoff should occur or whether wireless communications apparatus 202 should continue to handle communications/function(s). The criteria reviewed by analysis component 212 can include, but is not limited to, energy consumption mitigation of wireless communications apparatus 202, a direct link 214 connection strength, estimated amount of energy consumed by wireless communications apparatus 202 to communicate over direct link 214, or combinations thereof.

If analysis component 212 determines communication/function(s) should be handed off, a selection component 216 chooses a proxy node from the plurality of proxy nodes 206 for handoff of the communication/function(s) (or handoff for future communications/functions). In order to choose a proxy node, selection component 216 can obtain information related to each of the plurality of proxy nodes 206. The information can include, but is not limited to, an energy level of each of the plurality of proxy nodes 206 (e.g., remaining battery power), an estimated amount of energy consumed by each proxy node to communicate over respective indirect links 218, and a connection strength for each indirect link 218. For each proxy node, the information can include whether the proxy node is trusted, whether the proxy node has enough energy to support communications for wireless communications apparatus 202, the performance level of proxy node's WWAN link, the performance level of a peer-to-peer link 220 between wireless communications apparatus 202 and proxy node, or combinations thereof.

After proxy node has been chosen, an information exchange component 222 observes a synchronization period phase. During synchronization period phase, wireless communications apparatus 202 and selected proxy node exchange information that can facilitate the handoff. In accordance with some aspects, information exchange component 222 is configured to receive information that indicates a communication is to be handed off from a proxy node to wireless communications apparatus 202.

The information exchanged by information exchange component 222 can include at least one of bearer information, temporary mobile subscriber identity information, session encryption keys, packet processing state information, timing information, system information blocks, an identity of wireless communications apparatus 202, information regarding one or more base stations with which to communicate, wireless technology to utilize for communication, wireless channel frequency band for communication, time slots for communication with base stations, OFDMA time-frequency resource blocks, preferred roaming lists, frequency offset information for synchronization, timing skew differential for synchronization, primary synchronization codes, secondary synchronization codes, packet data protocol context information, transport control protocol information, TCP (Transmission Control Protocol) or UDP (User Datagram Protocol) socket information, applications being executed, application state information, application data, encryption keys associated with applications, and/or other information that chosen proxy node needs in order to continue the communication/function(s). The timing information can include the WWAN network resources used for voice and data sessions so the node can pick up the communication/function at the correct time.

In accordance with some aspects, an identity 224 of wireless communications apparatus 202 is transmitted if the communication was initiated by wireless communications apparatus and the handoff is a network unassisted handoff. The identity 224 can be used as the identity of the proxy device. For example, proxy device can assume identity 224 of wireless communications apparatus 202 (e.g., primary device) that is within range over a short-range wireless link between the devices.

In accordance with some aspects, a proxy node might have its own identity 226 (e.g., SIM, Universal Integrated Circuit Card (UICC), Virtual SIM (VSIM), and so forth) with a first set of services. Proxy node assumes additional responsibility (e.g., a second set of services) of the primary device utilizing an additional identity 224 associated with primary device. In this case, primary device may have a higher paid subscription with better services (as compared to the services of proxy node), such as high data rate usage support or flat unlimited pricing. By assuming the additional responsibility (and identity 224) proxy node can utilize the upgraded capabilities of primary device when supporting primary device. If primary device service capabilities are a superset of proxy device service capabilities, proxy device can select to use primary device identity 224. Proxy device identity 226 might still be needed for certain services, such as prepaid emergency service associated with proxy device. As examples, proxy device can be a car processing system with a WWAN modem, a healthcare device with a WWAN modem, a tablet/laptop with a WWAN modem, or another communication device with a WWAN modem.

According to some aspects, the identity 224 is a common identity shared upon the set of WWAN communication modem devices (e.g., wireless communications apparatus 202 and proxy nodes 206). Utilization of the common identity can be utilized such that only one device communicates at a time. In accordance with some aspects, the identity sharing is managed in a software VSIM that is transferred between the devices over a local peer-to-peer wireless link. In some aspects, the common identity is managed using a hardware SIM/UICC on a primary device and/or software session keys that are transferred during handoff. When proxy device communicates, any responses associated with the hardware SIM/UICC (such as the output of an integrity check procedure) can be obtained over the short-range peer-to-peer wireless slink between the devices and processed remotely using the hardware SIM/UICC on the primary device.

According to some aspects, during synchronization period phase, a "client-silence" phase is observed. During the "client-silence" phase, when a handoff is considered, nodes (e.g., wireless communications apparatus, user device, car modem, computer, and so on) that are involved in the handoff do not communicate with network 204 (e.g., a base station or other infrastructure entity). Thus, during the silence period phase, information exchange component 222 (optionally) stops communication with network 204 and sends to chosen proxy node information that is necessary for chosen proxy node to continue the communication/function(s) after handoff.

During the silence period phase (if utilized), network 204 may assume that wireless communications apparatus 202 is in a deep-fade state where wireless communications apparatus 202 is unable to respond. Network infrastructure (e.g., base station/WWAN) may optionally buffer packets and attempt retransmissions as network 204 waits to hear from wireless communications apparatus 202. In an example, voice packets may be discarded and/or signaling packets or data packets may be buffered and retransmitted. Network 204, however, is unaware that it will be hearing directly from WWAN-communicator proxy node instead of wireless communications apparatus 202 after handoff. Alternatively, network 204 is not aware that proxy node is handing off the communication to a user device, such as a phone, and that the phone will be resuming the communication.

In accordance with some aspects, the information exchange or synchronization with chosen proxy node occurs while wireless communications apparatus 202 continues to communicate with network 204.

A handoff component 228 is configured to attempt to handoff or transfer the communication and/or the one or more functions to/from selected node. According to an aspect, handoff component 228 is configured to receive a handoff of a communication from a proxy node. In accordance with some aspects, at least one of radio resource control signaling or non-access stratum signaling is retained by wireless communications apparatus 202. According to some aspects, the one or more functions relate to voice functions or vocoder functions that are handed off to chosen proxy node. According to some aspects, the communication is a voice call.

In accordance with some aspects, a timer 230 is started at about the same time as it is decided to handoff the communication/function(s) or about the same time as a proxy node is chosen. A value of timer 230 should be less than the amount of a network call drop time 232, which is the amount of time that network 204 waits before "dropping" a communication.

For example, during a communication, there might be times when a connectivity between wireless communications apparatus 202 and network 204 has been temporarily (or permanently) lost or unavailable. Periods of loss of connectivity can occur when wireless communications apparatus 202 is moved into a poor coverage area (e.g., basement of a building or house, driving through a tunnel, very high interference from other devices, loss of line-of-sight with a serving base station, and so on). In some cases, the loss of connectivity is only temporary and network 204 can allow time for the connectivity to be restored. For example, a communication is occurring and the user of wireless communications apparatus 202 steps into an elevator, in a few seconds the user steps out of the elevator. During those few seconds, network 204 waits and at about the same time as connectivity is restored (e.g., when the user steps out of the elevator), the communication can continue. However, if the loss of connectivity is longer than a certain amount of time (which can be predetermined as a function of system parameters, network parameters, or based on other factors), the call is "dropped" by network 204. If the user wishes to continue the communication, the call has to be reestablished (wireless communications apparatus originated or wireless communications apparatus terminated).

Value of timer 230 should be a fraction of the amount of time that network 204 waits for connectivity with wireless communications apparatus 202 to be reestablished (e.g., call drop time 232) or the duration of time that would trigger a call drop mechanism. For example, network 204 allows four seconds of no connectivity with wireless communications apparatus 202. If after four seconds connectivity has not been reestablished, network 204 drops the call. Thus, value of timer 230 should be less than four seconds. In another example, if a duration of a call drop mechanism trigger is five seconds, thus, the duration of timer 230 should be a value less than five seconds (e.g., half a second, one second, two and a half seconds, three seconds, four and a quarter seconds, and so on).

If handoff between nodes is accomplished in the portion or duration of time that is less than a fraction of allowed call drop time, application sessions can persist after handoff. If the communication does not successfully transfer before expiration of call drop timer, the call is "dropped". In accordance with some aspects, if timer 230 expires before completion of the handoff, the handoff has failed and wireless communications apparatus 202 can continue the call by communicating with network 204 before call drop time 232 expires and the communication is dropped by network 204. If the handoff is completed before expiration of timer 230, the application sessions (e.g., voice, data, video, or other communications) can persist after handoff (with the chosen proxy node).

In accordance with some aspects, wireless communications apparatus 202 and chosen proxy node can be in a wireless wide area network sniffing mode after successful handoff. During WWAN sniffing mode, wireless communications apparatus 202 continues to monitor the WWAN receive (Rx) signal information but does not engage in WWAN transmit (Tx) transmissions. The chosen proxy node engages in both WWAN Rx signal information and WWAN Tx transmissions. Chosen proxy node communicates its WWAN state information to wireless communications apparatus 202 over a wireless link between wireless communications apparatus 202 and chosen proxy node. The communication of WWAN state information allows wireless communications apparatus 202 to maintain a quasi-consistent state with respect to the WWAN stack for chosen proxy node.

According to some aspects, wireless communications apparatus 202 can be in a wireless wide area network dormant mode after successful handoff. During WWAN dormant mode, wireless communications apparatus 202 does not process the WWAN Rx signal information. Instead, wireless communications apparatus 202 receives periodic quasi-static updates regarding both the WWAN Rx and WWAN Tx protocol state information. The periodic quasi-static updates help keep wireless communications apparatus 202 protocol state quasi-consistent.

The WWAN dormant mode can enable additional energy savings over a WWAN sniffing mode because the WWAN dormant mode mitigates WWAN Rx processing. With periodic updates from the proxy node to maintain the protocol stack quasi-consistent, an incremental update should be sufficient to bring wireless communications apparatus 202 in synchronization with the proxy node to reach a fully-consistent WWAN protocol state during handoff. Maintaining quasi-consistency is helpful in the WWAN sniffing and dormant nodes so that, when handoff is desired, only incremental work is needed on wireless communications apparatus 202 to keep its WWAN protocol state synchronized in order to start communicating with the base station (or network 204). The state updates may be received periodically so that wireless communications apparatus 202 may sleep for a certain duration and periodically wake up to keep state consistency.

In accordance with some aspects, wireless communications apparatus 202 can be in a wireless wide area network sleeping mode after successful handoff. In the WWAN sleeping mode, a wireless wide area network radio and/or protocol stack of wireless communications apparatus 202 is inactive, which can provide additional energy savings. WWAN sleeping mode provides additional energy savings, which can keep the WWAN stack completely inactive but can result in increased delay in achieving the handoff. There can also be additional complexity in the protocol stack to synchronize the WWAN protocol stacks on each device (e.g., wireless communications apparatus 202 and chosen proxy node).

A memory 234 can be operatively coupled to wireless communications apparatus 202. Memory 234 can be external to wireless communications apparatus 202 or can reside within wireless communications apparatus 202. Memory 234 can store information related to supporting inter-device handoff (both from wireless communications apparatus 202 and to wireless communications apparatus 202). Memory 234 can store information related to signals transmitted and received in system 200.

Memory 234 can store protocols associated with inter-device handoff, taking action to control communication between wireless communications apparatus 202 and the plurality of proxy nodes 206 such that wireless communications apparatus 202 can employ stored protocols and/or algorithms to achieve improved communications in wireless communication network s as described herein.

Memory 234 can retain instructions related to deciding to transfer a communication to a selected node, conveying information to the selected node during a synchronization period, and attempting a handoff of at least one function to the selected node. The selected node can comprise a WWAN modem for communication with a WWAN. A common identity can be used by the selected node to communicate with the WWAN. The WWAN does not assist with the handoff.

In accordance with some aspects, memory 234 retains further instructions related to suspending a network communication during the synchronization period. According to some aspects, memory 234 retains further instructions related to starting a timer before the conveying and resuming network communication if timer expires before completion of the handoff. A value of timer is less than a value of a network call drop time. In accordance with some aspects, memory 234 can retain further instructions related to resuming the communication if the timer expired before the communication was transferred to the selected node.

In accordance with some aspects, memory 234 retains further instructions related to maintaining a wireless wide area network (WWAN) sniffing mode if the communication was transferred to the selected node (e.g., handoff is successful). WWAN sniffing mode comprises monitoring WWAN receive signal information.

According to some aspects, memory 234 retains further instructions related to maintaining a WWAN dormant mode if the communication was transferred to the selected node. WWAN dormant mode comprises receiving periodic quasi-static updates of WWAN receive protocol state information and WWAN transmit protocol state information.

In accordance with some aspects, memory 234 retains further instructions related to maintaining a WWAN sleeping mode if the communication was transferred to the selected node. The WWAN sleeping mode comprises inactivating at least one of a WWAN radio and a protocol stack.

In some aspects, memory 234 retains further instructions related to receiving a notification that the communication is to be handed off from the selected node, exchanging information related to the communication from the selected node, and continuing the communication handed off from the selected node.

It should be appreciated that data store (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

At least one processor 236 can be operatively connected to wireless communications apparatus 202 (and/or memory 234) to facilitate analysis of information related to inter-device handoff in a communication network. Processor 236 can be a processor dedicated to analyzing and/or generating information received by wireless communications apparatus 202, a processor that controls one or more components of system 200, and/or a processor that both analyzes and generates information received by wireless communications apparatus 202 and controls one or more components of system 200.

In accordance with some aspects, processor 236 is configured to perform a network unassisted communication handoff. Processor 236 can include a first module that determines a communication should be handed off and a second module that selects a node from a plurality of nodes to which the communication should be handed off. The node comprises a wireless wide area network (WWAN) modem used for communications with a WWAN. Processor 236 includes a third module that starts a timer that has a duration that is less than a network call drop time, a fourth module that observes a silence/synchronization period phase, and a fifth module that transfers information to the node. Also included is a sixth module that hands off the communication to the node. The WWAN does not assist with the hand off. The silence/synchronization period phase continues until expiration of the call drop timer or until the communication is successfully handed off to the node. Processor 236 can also comprise a seventh module for observing one of a wireless wide area network (WWAN) sniffing mode, a WWAN dormant mode, or a WWAN sleeping mode after the communication is successfully handed off to the node.

Figure 3:
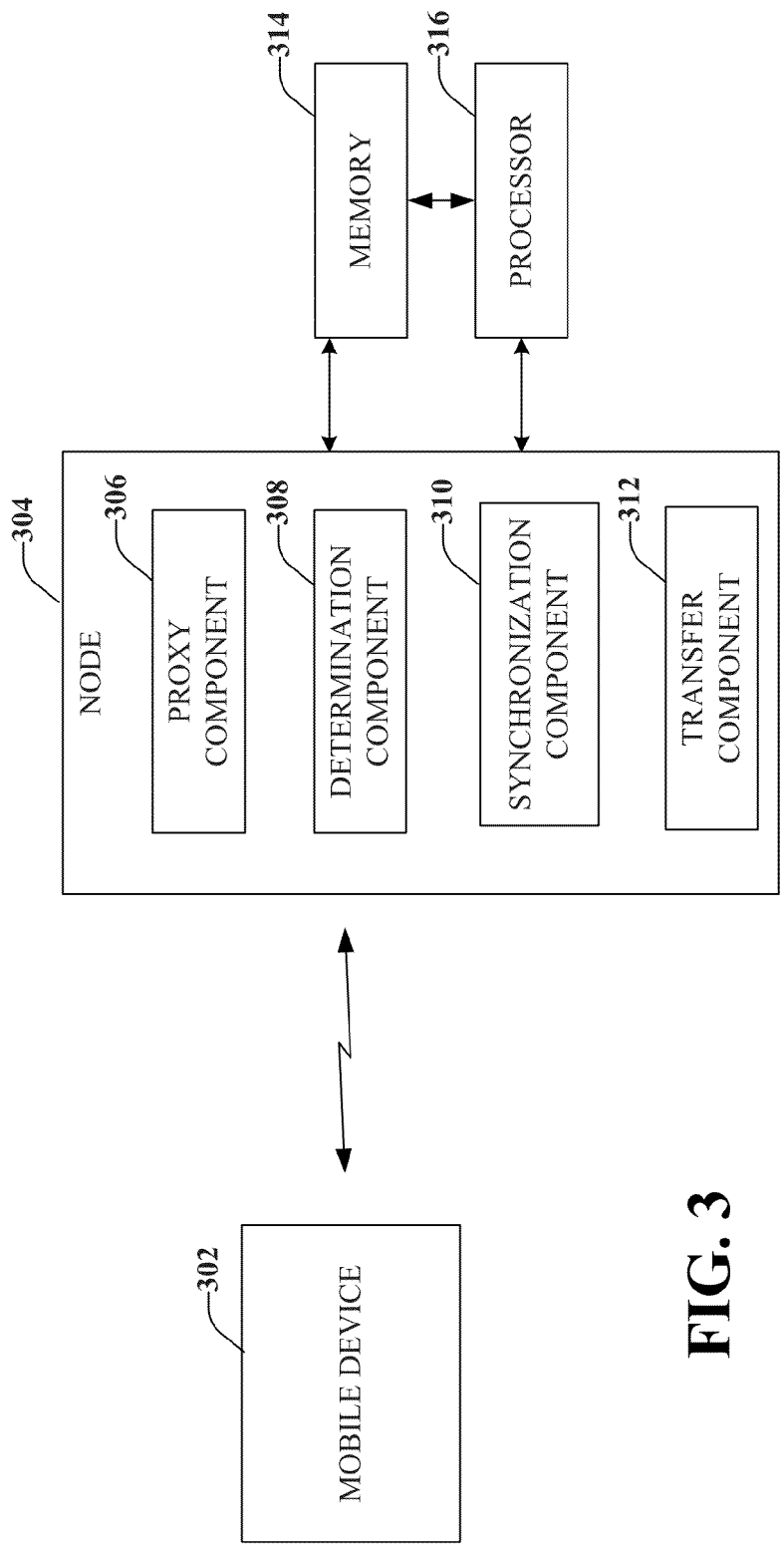
FIG. 3 illustrates a system that supports handoff from a node to a mobile device without network assistance, according to an aspect.

FIG. 3 illustrates a system 300 that supports handoff from a node to a mobile device without network assistance, according to an aspect. System 300 can be implemented in a wireless communication environment and includes at least one mobile device 302 and at least one node 304. Node 304 can include a proxy component 306 that is configured to handle at least one function on behalf of mobile device 302. The at least one function can be a communication, which can be a voice call. In accordance with some aspects, the at least one function is performing voice communications on behalf of mobile device 302. According to some aspects, the at least one function in vocoder functions. According to other aspects, the at least one function is a data call. In other aspects, the at least one function is an application.

According to some aspects, node 304 assumes the identity of mobile device 302 and performs various functions. In such a manner other devices, nodes, and/or network entities that are in communication with node 304 are not aware that a proxy is acting on behalf of mobile device 302. In some aspects, node 304 retains its own identity and assumes additional functions associated with an identity of mobile device 302.

Also included in node 304 is a determination component 308 that is configured to ascertain whether the at least one function should be handed off to mobile device 302. The function can be a function that was previously handed off from mobile device 302 to node 304. In accordance with some aspects, function is a function that was initiated by node 304 on behalf of mobile device 302.

In accordance with some aspects, determination component 308 ascertains the function(s) should be handed off based on receiving an indication from mobile device 302 (or a user of mobile device 302) that the functions should be transferred. In accordance with some aspects, determination component 308 utilizes a sensor, such as a motion sensor, from which an indication of movement of mobile device 302 is obtained. In an example, motion sensor can be operatively associated with determination component 308 and can obtain information that mobile device 302 is moving away from node 304.

If the function(s) should be handed off to mobile device 302, a synchronization component 310 is configured to convey information related to the handoff to mobile device 302, which can be received by an information exchange component associated with mobile device. The period during which synchronization of information between node 304 and mobile device 302 occur is referred to a synchronization phase. In accordance with some aspects, node 304 continues to communicate with network during synchronization phase. According to some aspects, both node 304 and mobile device 302 observe a silence period during which communication with network is temporarily suspended.

According to some aspects, a soft handoff period is observed during which an uplink pilot is sent. According to some aspects, an uplink pilot transmission from mobile device 302 occurs while node 304 is acting on behalf of mobile device 302. In accordance with some aspects, transmit power control information (TPC) can be set to alternate up/down or slightly more ups, which can mitigate a silence period and try to prevent call drop at the network.

A transfer component 312 is configured to attempt to handoff the one or more functions to mobile device 302. If the handoff of the communication is successful, mobile device 302 continues the communication handed off from node 304 to mobile device 302. In accordance with some aspects, the handoff to mobile device will not be successful and a call might be dropped. In this case, a prompt can be output (e.g., visually, audibly) to a user of mobile device. The prompt can ask the user if the call should be continued. The user can reply (e.g., though a user interface) and, if the user wants the call to continue, node 304 can resume the handling of the at least one function.

A memory 314 can be operatively coupled to nodes 304. Memory 314 can retain instructions related to performing at least one function on behalf of a device, determining the at least one function should be transferred to device, synchronizing information with device, and attempting to transfer the at least one function to device.

In accordance with some aspects, memory 314 retains further instructions related to monitoring progress of the transfer and reattempting the transfer as a function of a user request. According to an aspect, memory 314 retains further instructions related to sensing device is being moved away from the wireless communications apparatus. According to some aspects, memory 314 retains further instructions related to evaluating a signal quality, wherein the determining comprises instructions related to deciding to transfer the at least one function if the signal quality has degraded.

According to some aspects, memory 314 retains further instructions related to monitoring status of a vehicle engine, wherein the determining comprises instructions related to deciding to transfer the at least one function if the vehicle engine is powered off. For example, vehicle can communicate its status to one or more nodes. According to another aspect, memory 314 retains further instructions related to observing a silence period with a network when the information is synchronized with the mobile device. According to another aspect, memory 314 retains further instructions related to observing a soft handoff period and sending an uplink pilot during the soft handoff period.

At least one processor 316 can be operatively connected to node 304 (and/or memory 314) to facilitate network unassisted inter-device handoff. Processor 322 can comprise a first module that performs at least one function on behalf of at least one communication device. Processor 316 also comprises a second module that ascertains the at least one function should be handed off to communication device and a third module that suspends at least one communication with a network. Further, processor 316 comprises a fourth module that conveys information related to the at least one function to communication device during a synchronization period and a fifth module that attempts to handoff the at least one function to communication device.

In accordance with some aspects, processor 316 includes a sixth module that determines the handoff attempt was not completed and a seventh module that outputs a prompt related to continuation of the at least one function. Also included in processor 316 are an eighth module that receives a reply to the prompt and a ninth module that selectively resumes the handling of the at least one function based on the reply.

Figure 4:
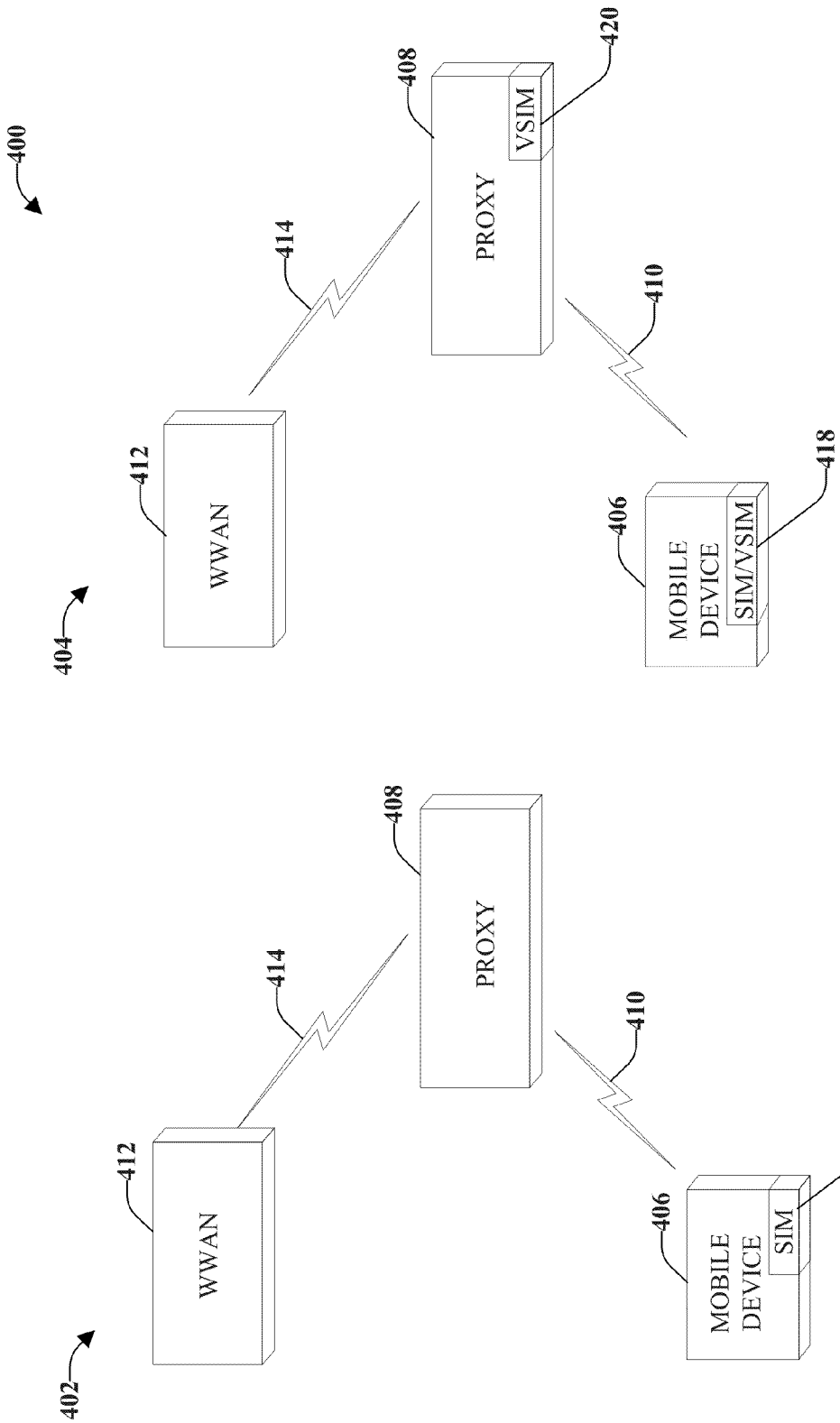
FIG. 4 illustrates an example system that utilizes an infrastructure unassisted proxy, according to an aspect.

With reference now to FIG. 4, illustrated is an example system 400 that utilizes a infrastructure-unassisted proxy node, according to an aspect. Network is not aware (nor does network need to be aware) with which node it is communicating according to example system 400 since all nodes share a single identity. The following will provide an example of a network unassisted mode. A user might purchase a cellular telephone and supplemental devices (e.g., wall-mounted modem, car modem, laptop interface, and so forth). Cellular telephone and supplemental devices might have a single subscriber identity module (SIM) card (e.g., on cellular telephone) and supplemental devices only have their respective modems. Cellular telephone should be in range of supplemental devices in order for utilization of supplemental device capabilities (e.g., can establish trust between devices without having a SIM card on each device).

There are at least two aspects 402, 404 for infrastructure-unassisted communicator approach. Either aspect 402, 404 can be utilized if the same identity is used at both mobile device 406 and proxy node 408 and only one device (mobile device 406 or proxy node 408) communicates with network using that identity (at any given time). Aspect 402 includes a mobile device 406 that communicates with a proxy node 408 over a peer-to-peer wireless link 410. Proxy node 408 conveys data from mobile device 406 to WWAN 412, over a WWAN link 414. As illustrated, mobile device 406 includes a SIM 416.

Aspect 404 includes mobile device 406 that conveys data to proxy node 408 over a peer-to-peer wireless link 410. Proxy node 408 conveys data to WWAN 412 over WWAN link 414. In accordance with this aspect 404, mobile device 406 includes a SIM/VSIM 418 (subscriber identity modem/virtual subscriber identity modem) and proxy node 408 includes a VSIM 420 (e.g., software SIM/virtual SIM). A VSIM enables sharing of identity between devices. In this aspect, network can program mobile device 406 and proxy node 408 with software identities and either (or both) mobile device 406 and proxy node 408 can communicate, which can be a function of an a pre-arranged agreement between mobile device 406 and proxy node 408. According to some aspects, the software VSIM can be present on all the devices all the time, but the devices agree as to who uses the software VSIM at a given time. Alternatively or additionally, the software VSIM can be exchanged between devices to determine which devices communicate with the WWAN.

Figure 5:
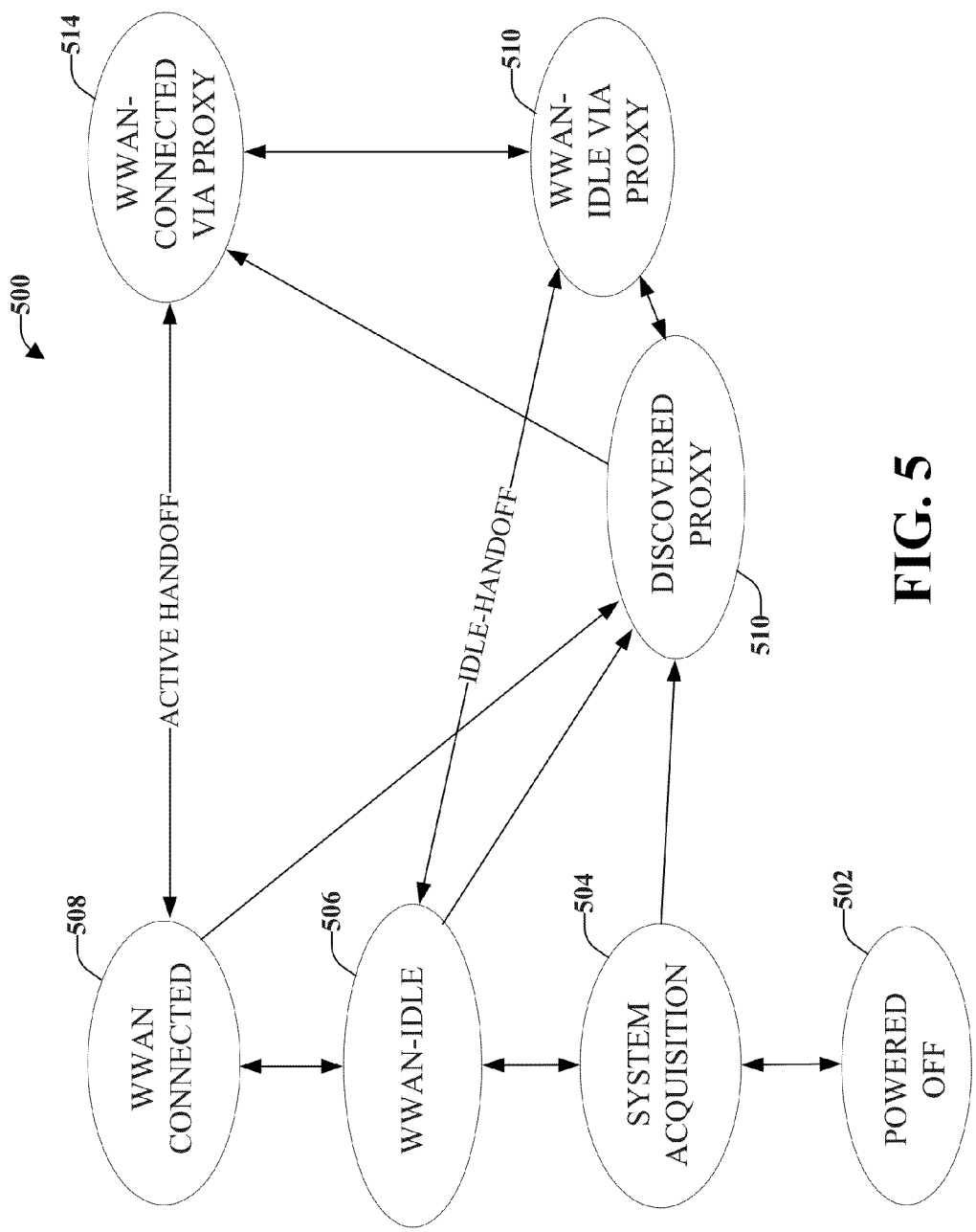
FIG. 5 illustrates handset states according to various aspects.

FIG. 5 illustrates device states or handset states 500 according to various aspects. There are various network-unassisted handset states that include powered off state 502, system acquisition state 504, WWAN idle state 506, WWAN connected state 508, discovered proxy state 510, WAN idle via proxy state 512, and WWAN connected via proxy state 514.

Initially, device can be powered off state 502. When power is turned on, device enters system acquisition state 504 and searches for one or more base stations and connects to one of the base stations. Device can enter WWAN idle state 506 where the device is connected and waiting for a communication (device originated or device terminated). In WWAN idle state 506, the device software goes to sleep (or enters a low power mode) and wakes up periodically to determine if there is a communication. If there is no communication, device goes back to sleep and repeats the wake up/sleep cycle. If there is a communication, device enters WWAN connected state 508. In the WWAN connected state 508, there is an active session, such as a voice call or an active data session over the Internet in process.

Device can enter discovered proxy state 510 from one of the original states (e.g., system acquisition state 504, WWAN idle state 506 or WWAN connected state 508). The search in system acquisition state 504 or WWAN idle state 506 can be over BlueTooth®. The discovered proxy state 510 occurs when device discovers one or more nodes (or communicators) to/from which an active session can be handed off. If a communicator proxy is found, device determines if the communicator proxy is desirable to use (e.g., proxy is trusted, proxy has energy to support handset, proxy's WWAN link is good, peer-to-peer link with proxy is good, and so forth). If communicator proxy is desirable and device is in system acquisition state 504, proxy accesses SIM and registers with network. If communicator proxy is desirable and device is in WWAN idle state 506, then registration information is transferred to the proxy. There can be state transitions between WWAN idle via proxy state 512 and WWAN connected via proxy state 514.

An idle-handoff to WWAN-idle via proxy state 512 can occur from either the WWAN-idle state 506 or the discovered proxy state 510. For example, the WWAN-idle via proxy state 512 can occur when a handoff to a car modem has occurred, but there is no data being exchanged (e.g., no voice call).

An active-handoff to WWAN Connected via proxy state 514 can occur from WWAN connected state 508 or discovered proxy state 510. The WWAN connected via proxy state 514 occurs when there is an active session occurring at substantially the same time as the handoff between the device and the node is conducted (network unassisted mode, network assisted mode).

In accordance with some aspects, the trigger from WWAN Connected via proxy state to WWAN connected state and/or from WWAN idle via proxy state to WWAN idle state can be based on various criteria. The trigger criteria can include a BlueTooth® signal strength, a user input, another input such as car ignition power off, or other device criteria. In an example, there can be a timer in the vehicle circuitry and, after the ignition is turned off, the radio can remain enabled to allow time (e.g., x seconds, where x is an integer) for synchronization between the vehicle radios and the mobile device and for handoff to the mobile device. In another example, the link quality can fade (signal strength diminishes) as a user walks away from the vehicle, which can be the reason for the handoff.

In an example, communicator proxy can advertise itself (and that it is available to act as a proxy). Communicator proxy can scan the radio environment and build/continuously update WWAN database of GSM (Global System for Mobile Communications)/WCDMA (Wideband Code Division Multiple Access) radio frequencies, cell information, and so on. When wireless communications apparatus requests WWAN access, communicator proxy can scan based on handset-provided information/preferences and register with the network. For transition between WWAN-idle state and Idle-via-proxy, state each transition could be followed by a registration. The power impact of this to the communicator proxy can be small. Communicator proxy can stay in idle until an incoming or outgoing communication arrives.

A user interface of a wireless communications apparatus can be configured to reflect registration with network and idle/connected state. In accordance with some aspects, user interface can indicate access via proxy. There can be periodic/trigger-based communication over BlueTooth® between wireless communications apparatus 202 and proxy node to indicate a network access state. The network access state can be indicated by bars, an indicator status light, or other means of rendering (e.g., visually, audibly, and so on) the state to the user. The bars (or other means) can be updated or refreshed periodically, continuously, or based on another period.

In accordance with some aspects, a communication (e.g., call) can be originated or terminated via wireless communications apparatus user interface or a user interface associated with the proxy. Both wireless communications apparatus and proxy can be maintained in synchronization regarding the communication (call) status. In accordance with some aspects, wireless communications apparatus can transfer to connected-via-proxy state.

In accordance with some aspects, state maintain occurs during connected-via-proxy state. The proxy and wireless communications apparatus maintain databases of Non Access Stratum (NAS), radio resource control (RRC), Physical (PHY) state, or another layer in the protocol. The databases can include RRC connection state, neighbor list, measurements, timers, active set, integrity and ciphering key parameters. The databases can include radio frequency (RF) carrier, uplink/downlink scrambling codes, orthogonal variable spreading factor (OVSF) codes, Spreading Factor, Frame offsets, uplink power level, downlink cell(s) timing, uplink timing. The databases can include timer active sets, parameters, scrambling codes, spreading codes, spreading factors, uplink power level, cell timing, and so forth.

The databases between the proxy and wireless communications apparatus can be mirrored (or substantially the same). Updates to the databases can be periodic and/or trigger based, which can maintain proxy and wireless communications apparatus in pseudo-synchronization. The trigger can be that more than a certain number of bytes has changed or that a "major" WAN event has occurred. Examples of major WAN events include changes in active set, changes in protocol state, and so forth. The trigger can be that a distance between proxy and wireless communications apparatus is expanding (the devices are getting farther away from each other) or that the Bluetooth® signal is becoming weak. In accordance with some aspects, the wireless communications apparatus (or the proxy) only receives the updates if a handoff is imminent.

In accordance with some aspects, communicator proxy can suggest wireless communications apparatus can go to sleep by suggesting a "next time for communications between the two devices." Wireless communications apparatus has the option to sleep and can wake up at an appropriate time (just in time) to communicate with communicator proxy. The sleep duration of wireless communications apparatus should be identified based on delay consideration for system response times.

Handoff considerations that should be addressed include handoff to WAN connected and can include state transfer. In state transfer, a switchover time is determined. All states (NAS, RRC, and so on) are transferred before the switchover (e.g., 10 ms prior to switchover, 20 ms prior to switchover). Transferring the states in anticipation of the switchover allows the protocol stack to perform functions necessary in order to use the transferred information at substantially the same time as handoff occurs.

In accordance with some aspects, call search assistance is utilized for handover to WAN connected. Call search assistance can be sped up if the proxy provides access information for at least the active set. In terms of determining which base station or cell to use, at a minimum the proxy should provide the active set information. Wireless communications apparatus can then determine which base station it should use. For example, there are three base stations being used by soft combining (it is possible that three base stations are used or only a subset of the base stations are used). Provided proxy supplies the active state information, wireless communications apparatus should have the information necessary to continue the communication after handoff.

In accordance with some aspects, there can be adjustment to a power level at about the same time as handoff. For example, wireless communications apparatus signal quality at transition may be weaker than proxy signal quality. To compensate, wireless communications apparatus can boost transmit power slightly at transmission. Proxy can also request downlink power boost prior to handover. Proxy can request a power boost on the downlink from the base station. The base station can start sending a stronger signal so that the signal reaches wireless communications apparatus. The changes to the power level can compensate for the differences between the link qualities of the two devices. In an example, base station is communicating to a vehicle modem, which has an antenna outside the vehicle and, therefore, does not suffer the attenuation that occurs if the signal needs to penetrate the vehicle body. If wireless communications apparatus is in the user's pocket (or purse), the strength of the signal from base station to wireless communications apparatus is lower because the communication has to penetrate the vehicle body. Thus, the receive signal might need to be stronger to reach the wireless communications apparatus and the transmit power (from the wireless communications apparatus) might need to be stronger to reach the base station.

Timing issues should also be considered by the devices. The timing at proxy should be with respect to proxy system time (wall counter). To transfer timings from proxy to handset, there should be a common reference. A channel impulse response of one or more strongest WAN cells can be utilized as the common reference.

In view of exemplary systems shown and described above, methodologies that may be implemented in accordance with the disclosed subject matter, will be better appreciated with reference to various flow charts. While, for purposes of simplicity of explanation, methodologies are shown and described as a series of blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g., device, system, process, component). Additionally, it should be further appreciated that methodologies disclosed throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 6:
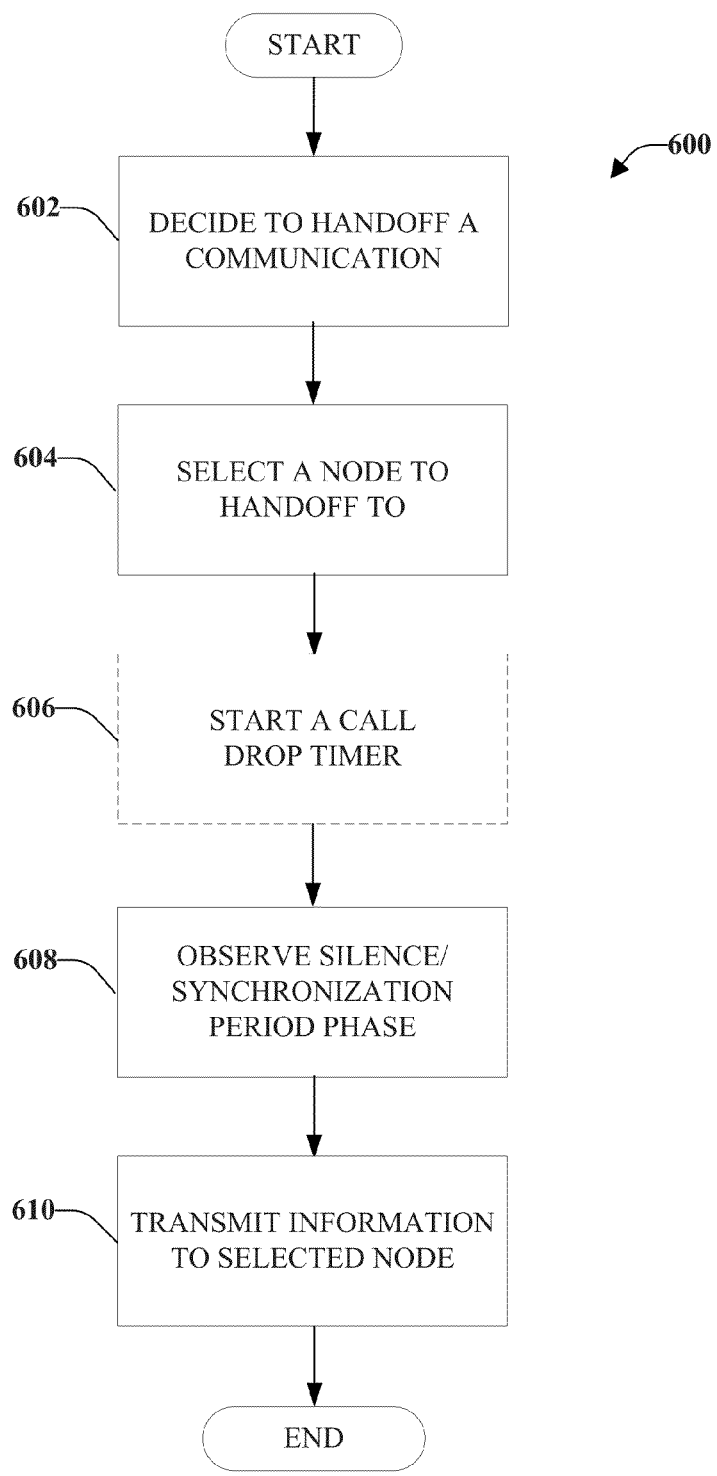
FIG. 6 illustrates a method for infrastructure unassisted inter-device handoff, according to an aspect.

FIG. 6 illustrates a method 600 for infrastructure unassisted inter-device handoff, according to an aspect. Method 600 can be performed by a wireless communications device that comprises a WWAN modem for communications with a WWAN. Wireless communications device can handoff communications as well as receive communications handed off from another node. For example, a first communications device can hand off communications to a second communications device. Both devices can comprise separate WWAN modems for communication with a WWAN.

In accordance with some aspects, the WWAN does not assist with the handing off but the WWAN is aware of the handing off. In another aspect, the WWAN does not assist with the handing off and the WWAN is not aware of the handing off.

Method 600 starts, at 602, when a decision is made to handoff a communication (and/or at least one function) from a first device to a second device. The communication is a two-way communication facilitated by the first communications device or the second communications device. The device that does not facilitate the communication is receiving the communication.

The decision can be made based on an estimation that energy consumption of communications device will be less if another node handles the communication. The decision can be made based on an estimated direct link connection strength. If the strength of the direct link connection has been compromised, then it might be beneficial to have a node with a better connection strength continue the communication. The decision can be made based on an estimated amount of energy that will be consumed by communications device to communicate over the direct link. The decision can be made based on one or more of an estimated energy consumption mitigation of communications device, an estimated direct link connection strength, and an estimated amount of energy consumed by communications device to communicate over direct link.

At 604, a node to which the communication should be handed off is selected. The node can be selected from a plurality of nodes that are associated with communications device or that are discoverable by communications device. The selection can be based on an estimated energy level of each node of the plurality of nodes. The selection can be based on an estimated energy consumed by each node of the plurality of nodes to communicate over respective indirect links. The selection can be based on an estimated connection strength for each indirect link. The selection can be based on one or more of an estimated energy level of each node of the plurality of nodes, an estimated amount of energy consumed by each node of the plurality of nodes to communicate over respective indirect links, an estimated connection strength for each indirect link, or combinations thereof.

In accordance with some aspects, an optional timer is started, at 606. Timer can have a duration that is less than a network call drop time. For example, during a communication, network will allow for periods of silence from communications device. These periods of silence might be because communications device has been moved, temporarily, to an area with limited or no connectivity with network. If the period of silence is temporary (e.g., less than a certain amount of time), network will wait and allow the communication to continue (e.g., connectivity to be restored). However, if the period of silence is for a duration that is not temporary (e.g., longer than the certain amount of time), network will assume that communications device is not able to continue the communication and network will drop the call. In accordance with some aspects, method 600 comprises requesting an adjustment to a power level before starting timer (e.g., to compensate for differences between transmit and receive powers).

At about the same time as timer is started (if used), a silence/synchronization period phase is observed, at 608, by communications device and selected node. During silence period phase, neither communications device nor selected node communicate with the network. Thus, communications device and selected node suspend communication with network. According to some aspects, method 600 comprises performing a state transfer during the silence period phase. If a synchronization period is observed (but no silence period), there is communication with the network while communications device and selected node exchange information.

At 610, information is transferred to selected node. The transferred information can comprise bearer information, temporary mobile subscriber identity information, session encryption keys, packet processing state information, timing information, system information blocks, an identity of communications device, or combinations thereof.

The silence period phase continues until expiration of the call drop timer (if used) or until a communication is successfully handed off to selected node. If the call drop timer has expired (or is about to expire), method 600 can resume the communication with the network as if the handoff was not attempted, in an attempt to avoid a network call drop.

If the communication is successfully handed off, method 600 can continue by supporting a WAN sniffing mode, which comprises monitoring WWAN receive signal information. In accordance with some aspects, if the communication was successfully handed off, method 600 continues by maintaining a WWAN dormant mode, which comprises receiving periodic quasi-static updates of wireless wide area network receive protocol state information and wireless wide area network transmit protocol state information. According to some aspects, if the communication is successfully handed off, method 600 continues with sustaining a WWAN sleeping mode, which comprises inactivating a wireless wide area network radio and/or a protocol stack.

According to various aspects, method 600 can include conveying an identity of the communications device to the node (where communications device initiated the communication) and releasing the communication, wherein the node utilizes the identity of the communications device to continue the communication over a network. For example, a common identity associated with the WWAN is used for the communication for a first communicates device and a second communications device (e.g., which ever device is currently performing the communicating with the WWAN). The common identity can be shared among a plurality of communications devices. In an aspect, the common identity is associated with first communications device and shared with second communications device. In another aspect, the common identity is associated with the second communications device and shared with the first communications device. In accordance with some aspects, the common identity is a software identity.

In some aspects, method 600 includes performing timing synchronization between wireless communications apparatus and selected node (e.g. two devices) using a common signal associated with the WWAN. For example, timing synchronization can be performed between modems of the devices utilizing a common signal associated with the WWAN. A signal associated with the base station that has the strongest signal could be used. Signals from the base station, such as the channel impulse response, or a synchronization signal, can be used for timing synchronization between the devices. In accordance with some aspects, the devices can exchange information over a short range peer-to-peer wireless link periodically (or at other time intervals) regarding the base station/access point that should be used for timing, which can help ensure that the same base station is used by both devices. When the base station with the strongest signal changes, one device can inform the other device of the change, and both devices can agree to switch to that base station. When one of the devices is in a communication session with the WWAN, and the network decides to perform a network handoff from a first base station to a second base station, then that device can inform the other device of the change in the base station that is being used for timing synchronization.

According to some aspects, method includes receiving an indication that the communication is to be transferred from second device to first device. Information related to the handoff from second device can be exchanged between first device and second device. Method also includes continuing the communication handed off from the second device.

In accordance with some aspects, a computer program product can include a computer-readable medium that comprises codes for carrying out various aspects of method 600. Computer-readable medium can include a first set of codes for causing a computer to decide to transfer a communication and a second set of codes for causing the computer to select a node for the communication transfer. The node comprises a WWAN modem. Computer-readable medium includes a third set of codes for causing the computer to discontinue a network communication. Computer-readable medium includes a fourth set of codes for causing the computer to convey information (including at least a common identity) to the node and a fifth set of codes for causing the computer to release the communication to the node. The communication is released without assistance from the network.

In accordance with some aspects, computer-readable medium comprises a sixth set of codes for causing the computer to monitor a time between discontinuing the network communication and the release of the communication to the node. Computer-readable medium comprises a seventh set of codes for causing the computer to discontinue the transfer if the time is longer than a portion of a network call drop time.

Figure 7:
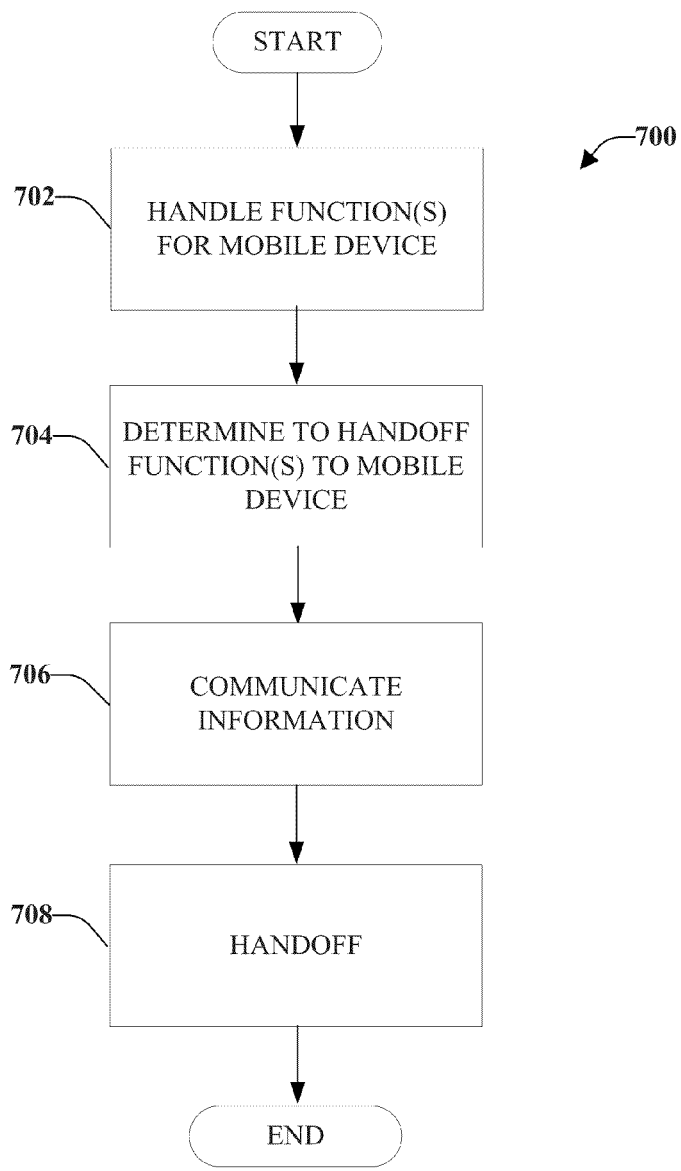
FIG. 7 illustrates a method performed by a node for network unassisted inter-device handoff, according to an aspect.

FIG. 7 illustrates a method 700 performed by a node for network unassisted inter-device handoff, according to an aspect. Method 700 starts, at 702 when at least one function is handled on behalf of at least one primary device through utilization of an identity of the primary device. The at least one function can be performing voice communications, data communications, or one or more applications on behalf of primary device. Handling at least one function can include utilizing an identification of primary device.

At 704, a determination is made that the at least one function should be handed off to primary device. Information related to the at least one function is communicated to primary device, at 706, during a synchronization period. In accordance with some aspects, method 700 includes observing a silence period with a network during the synchronization period. According to some aspects, method 700 includes observing a soft handoff period and sending an uplink pilot during the soft handoff period. At 708, an attempt to handoff the at least one function to primary device occurs. In accordance with some aspects, if the handoff was not successful, a prompt related to continuation of the at least one function is output to a user. The user can reply with a request to continue the at least one function or to not continue the at least one function. If the function is to continue, handling of the least one function is selectively resumed.

In accordance with some aspects, a computer program product can include a computer-readable medium that comprises codes for carrying out various aspects of method 700. Computer-readable medium can include a first set of codes for causing a computer to perform at least one function on behalf of a mobile device and a second set of codes for causing the computer to determine the at least one function should be transferred to mobile device. Also included is a third set of codes for causing the computer to synchronize information with the mobile device and a fourth set of codes for causing the computer to attempt to transfer the at least one function to the mobile device. According to some aspects, computer-readable medium further comprises a fifth set of codes for causing the computer to discontinue network communications while the information is synchronized with the mobile device.

Figure 8:
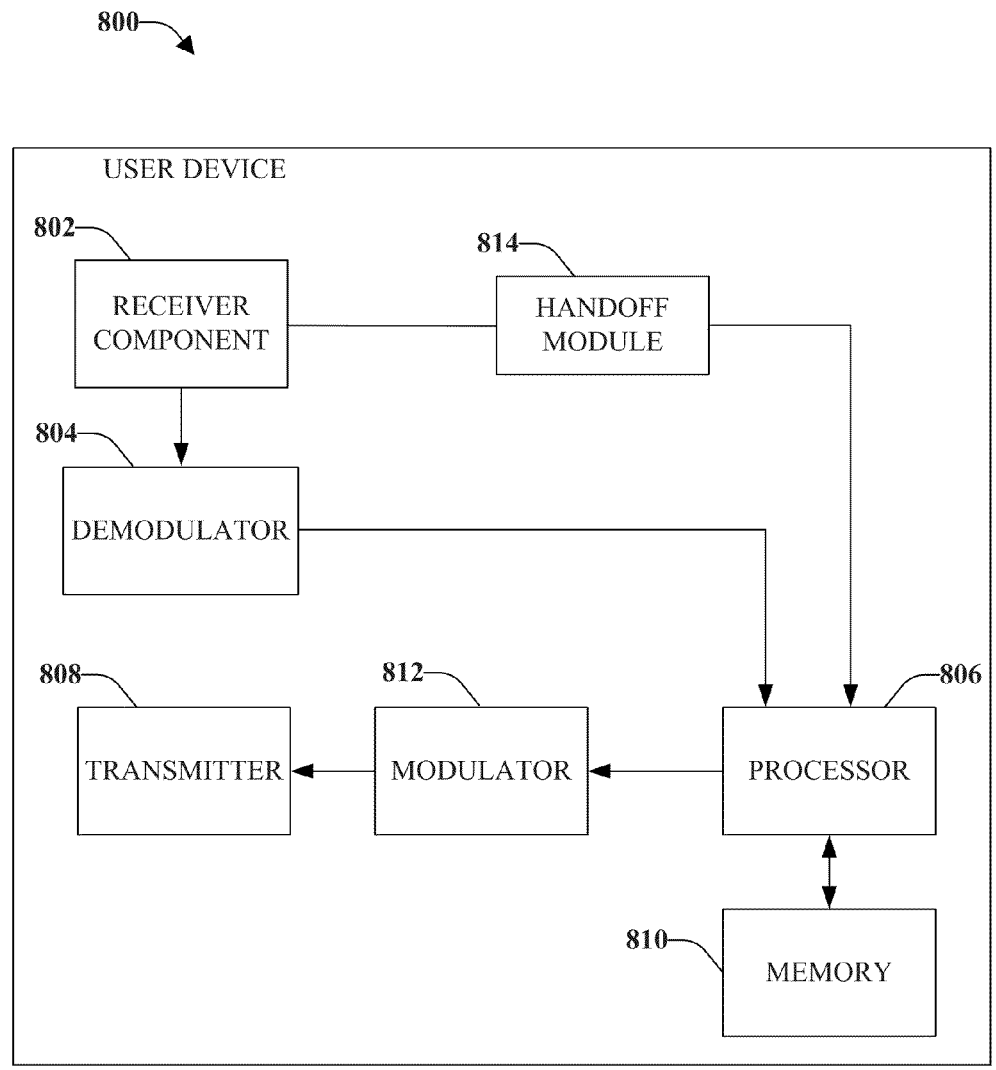
FIG. 8 illustrates a system that facilitates infrastructure unassisted inter-device handoff in accordance with one or more of the disclosed aspects.

With reference now to FIG. 8, illustrated is a system 800 that facilitates an infrastructure unassisted inter-device handoff in accordance with one or more of the disclosed aspects. System 800 can reside in a user device. System 800 comprises a receiver component 802 that can receive a signal from, for example, a receiver antenna. Receiver component 802 can perform typical actions thereon, such as filtering, amplifying, downconverting, etc. the received signal. Receiver component 802 can also digitize the conditioned signal to obtain samples. A demodulator 804 can obtain received symbols for each symbol period, as well as provide received symbols to a processor 806.

Processor 806 can be a processor dedicated to analyzing information received by receiver component 802 and/or generating information for transmission by a transmitter 808. In addition or alternatively, processor 806 can control one or more components of system 800, analyze information received by receiver component 802, generate information for transmission by transmitter 808, and/or control one or more components of system 800. Processor 806 may include a controller component capable of coordinating communications with additional user devices.

System 800 can additionally comprise memory 810 operatively coupled to processor 806. Memory 810 can store information related to coordinating communications and any other suitable information. Memory 810 can additionally store protocols associated with inter-device handoff. System 800 can further comprise a symbol modulator 812, wherein transmitter 808 transmits the modulated signal.

Receiver component 802 is further operatively coupled to a handoff module 814 that is configured to selectively handoff a communication to one or more nodes. The communication handoff can be with infrastructure assistance or without infrastructure assistance. If the handoff is without infrastructure assistance a silence period is observed during which no communications are conducted with the infrastructure. In accordance with some aspects, a synchronization period can be observed, wherein there is synchronization for the handoff at substantially the same time as communications are ongoing with the infrastructure.

Figure 9:
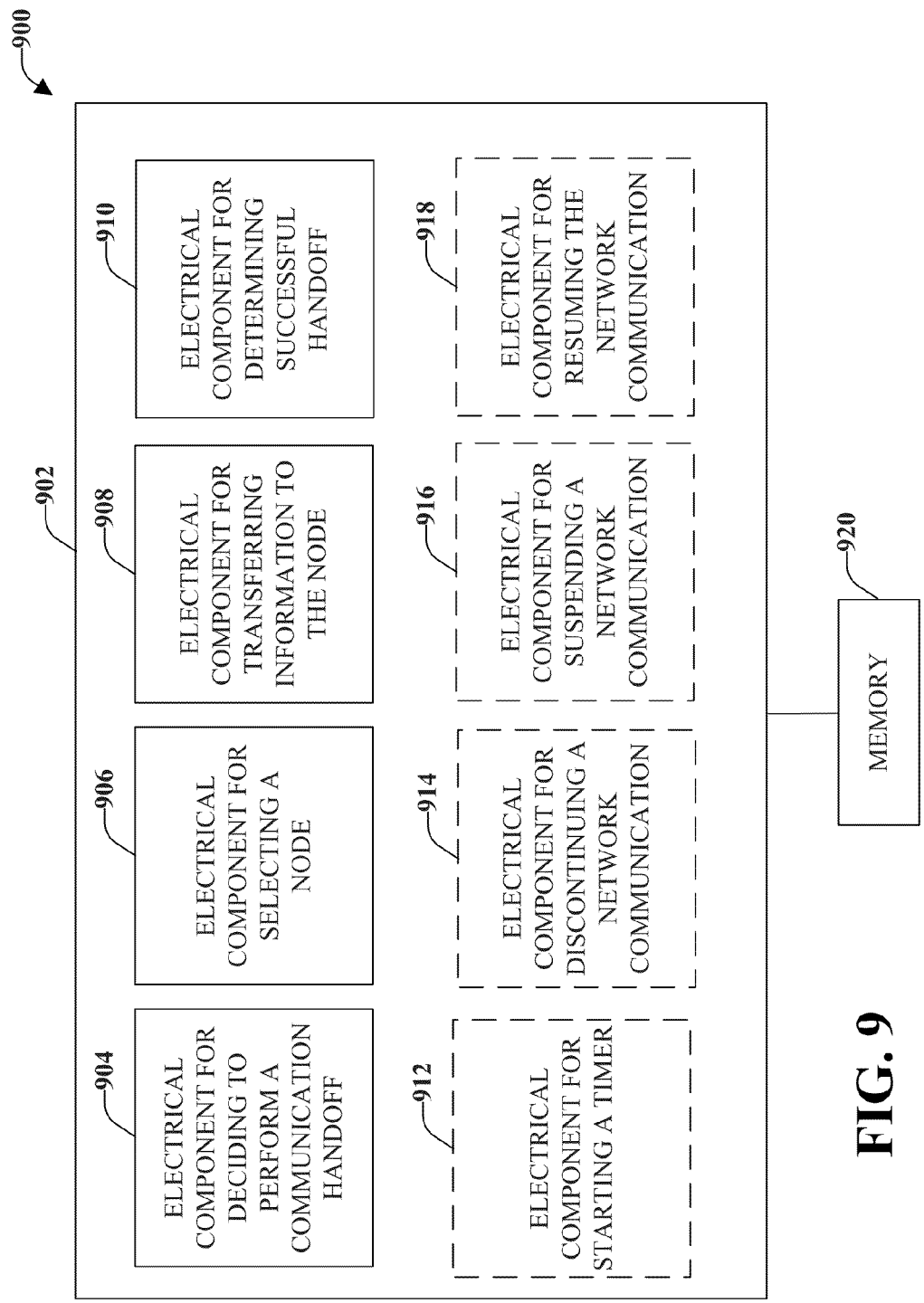
FIG. 9 illustrates an example system that facilitates inter-device handoff without network assistance, according to an aspect.

With reference to FIG. 9, illustrated is an example system 900 that facilitates inter-device handoff without network assistance, according to an aspect. System 900 may reside at least partially within a mobile device. It is to be appreciated that system 900 is represented as including functional blocks, which may be functional blocks that represent functions implemented by a processor, software, or combination thereof (e.g., firmware).

System 900 includes a logical grouping 902 of electrical components that can act separately or in conjunction. Logical grouping 902 includes an electrical component 904 for deciding to transfer at least one function to a node and an electrical component 906 for selecting the node for the transfer. The node comprises a WWAN modem for communication with a WWAN. Logical grouping 902 also includes an electrical component 908 for transferring identity information and information related to at least one function to the node and an electrical component 910 for determining the at least one function is successfully handed off to the node. The WWAN does not assist with the handoff.

In accordance with some aspects, logical grouping 902 includes an electrical component 912 for starting a timer and an electrical component 914 for discontinuing a network communication. According to some aspects, logical grouping 902 includes an electrical component 916 for suspending a network communication and an electrical component for resuming the network communication if the at least one function is not successfully handed off to the node.

In accordance with some aspects, logical grouping includes an electrical component for requesting a power level adjustment after the call drop timer is started. In accordance with some aspects, logical grouping includes an electrical component for monitoring wireless wide area network receive signal information after the communication handoff. Alternatively or additionally, logical grouping includes an electrical component for receiving periodic quasi-static updates of WWAN receive protocol state information and WWAN transmit protocol state information after the communication handoff. Alternatively or additionally, logical grouping includes an electrical component for inactivating a wireless wide area network radio and/or protocol stack after the communication handoff.

Additionally, system 900 can include a memory 920 that retains instructions for executing functions associated with electrical components 904-918 or other components. While shown as being external to memory 920, it is to be understood that one or more of electrical components 904-918 may exist within memory 920.

Figure 10:
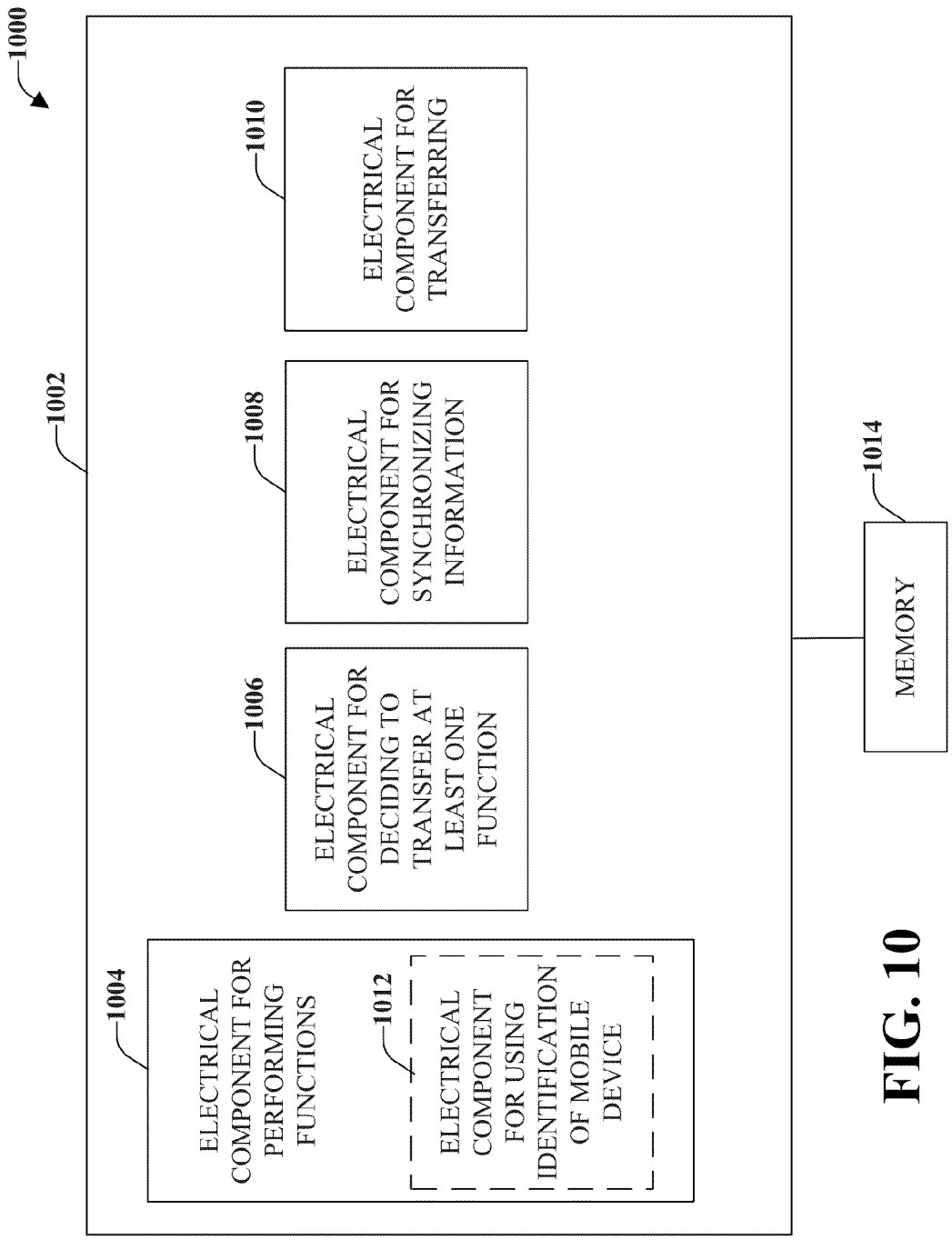
FIG. 10 illustrates a system that is configured to perform network unassisted inter-device handoff, according to an aspect.

FIG. 10 illustrates a system 1000 that is configured to perform network unassisted inter-device handoff, according to an aspect. System 1000 may reside at least partially within a node and is represented as including functional blocks, which may be functional blocks that represent functions implemented by a processor, software, or combination thereof (e.g., firmware).

System 100 includes a logical grouping 1002 of electrical components that can act separately or in conjunction. Logical grouping 1002 includes an electrical component 1004 for performing one or more functions on behalf of a mobile device and an electrical component 1006 for deciding to transfer at least one of the functions to mobile device. Logical grouping 1002 also includes an electrical component 1008 for synchronizing information related to the at least one function with mobile device. Also included is an electrical component 1010 for transferring the at least one function to mobile device without network assistance. In accordance with some aspects, electrical component 1004 comprises an electrical component 1012 for utilizing an identification of mobile device.

System 1000 can include a memory 1014 that retains instructions for executing functions associated with electrical components 1004-1012 or other components. While shown as being external to memory 1014, it is to be understood that one or more of electrical components 1004-1012 may exist within memory 1014.

Figure 11:
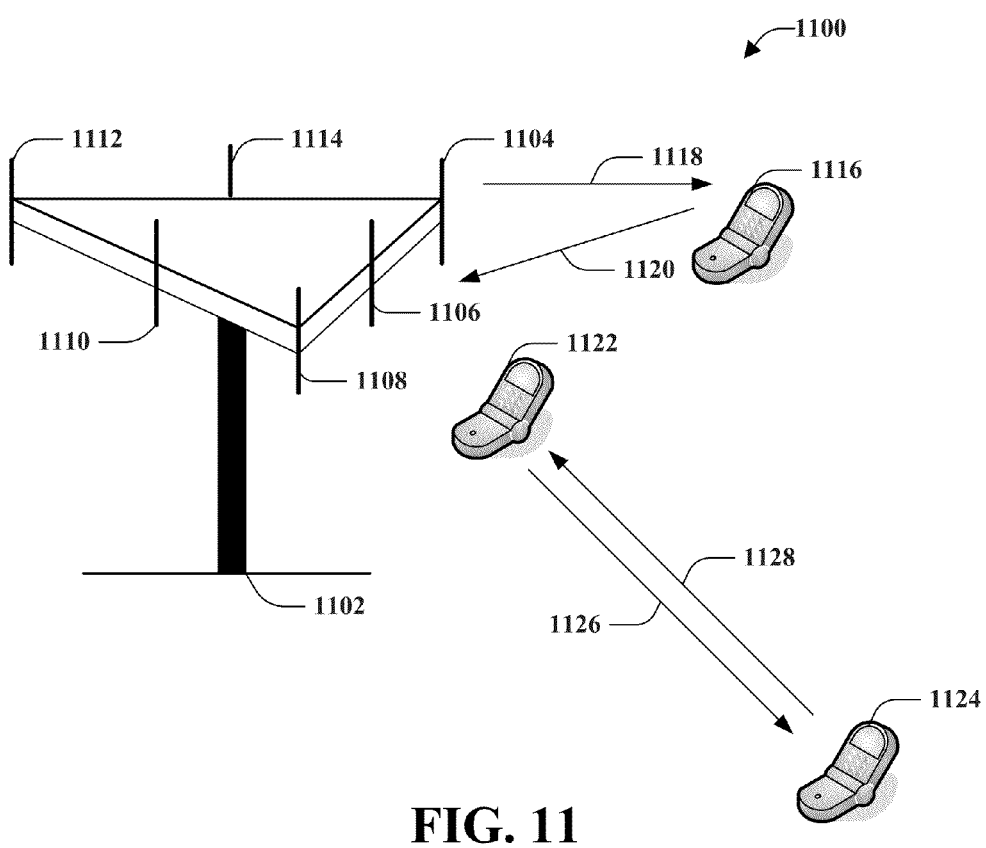
FIG. 11 illustrates a wireless communication system in accordance with various aspects.

Referring now to FIG. 11, illustrated is a wireless communication system 1100 in accordance with various aspects. Wireless communications system 1100 comprises a base station 1102 that can include multiple antenna groups. For example, one antenna group can include antennas 1104 and 1106, another group can comprise antennas 1108 and 1110, and an additional group can include antennas 1112 and 1114. Two antennas are illustrated for each antenna group; however, more or fewer antennas can be utilized for each group. Base station 1102 can additionally include a transmitter chain and a receiver chain, each of which can in turn comprise a plurality of components associated with signal transmission and reception (e.g., processors, modulators, multiplexers, demodulators, demultiplexers, antennas, and so forth), as will be appreciated by one skilled in the art. Additionally, base station 1102 can be a home base station, a Femto base station, and/or the like.

Base station 1102 can communicate with one or more devices such as device 1116; however, it is to be appreciated that base station 1102 can communicate with substantially any number of devices similar to device 1116. As depicted, device 1116 is in communication with antennas 1104 and 1106, where antennas 1104 and 1106 transmit information to device 1116 over a forward link 1118 and receive information from device 1116 over a reverse link 1120. In a frequency division duplex (FDD) system, forward link 1118 can utilize a different frequency band than that used by reverse link 1120, for example. Further, in a time division duplex (TDD) system, forward link 1118 and reverse link 1120 can utilize a common frequency band.

In addition, devices 1122 and 1124 can be communicating with one another, such as in a peer-to-peer configuration. Moreover, device 1122 is in communication with device 1124 using links 1126 and 1128. In a peer-to-peer ad hoc network, devices within range of each other, such as devices 1122 and 1124, communicate directly with each other without a base station 1102 and/or a wired infrastructure to relay their communication. Additionally, peer devices or nodes can relay traffic. Devices within network communicating in a peer-to-peer manner can function similar to base stations and relay traffic or communications to other devices, functioning similar to base stations, until the traffic reaches its ultimate destination. Devices can also transmit control channels, which carry information that can be utilized to manage the data transmission between peer nodes.

A communication network can include any number of devices or nodes that are in wireless (or wired) communication. Each node can be within range of one or more other nodes and can communicate with the other nodes or through utilization of the other nodes, such as in a multi-hop topography (e.g., communications can hop from node to node until reaching a final destination). For example, a sender node may wish to communicate with a receiver node. To enable packet transfer between sender node and receiver node, one or more intermediate nodes can be utilized. It should be understood that any node can be a sender node and/or a receiver node and can perform functions of either sending and/or receiving information at substantially the same time (e.g., can broadcast or communicate information at about the same time as receiving information) or at different times.

Figure 12:
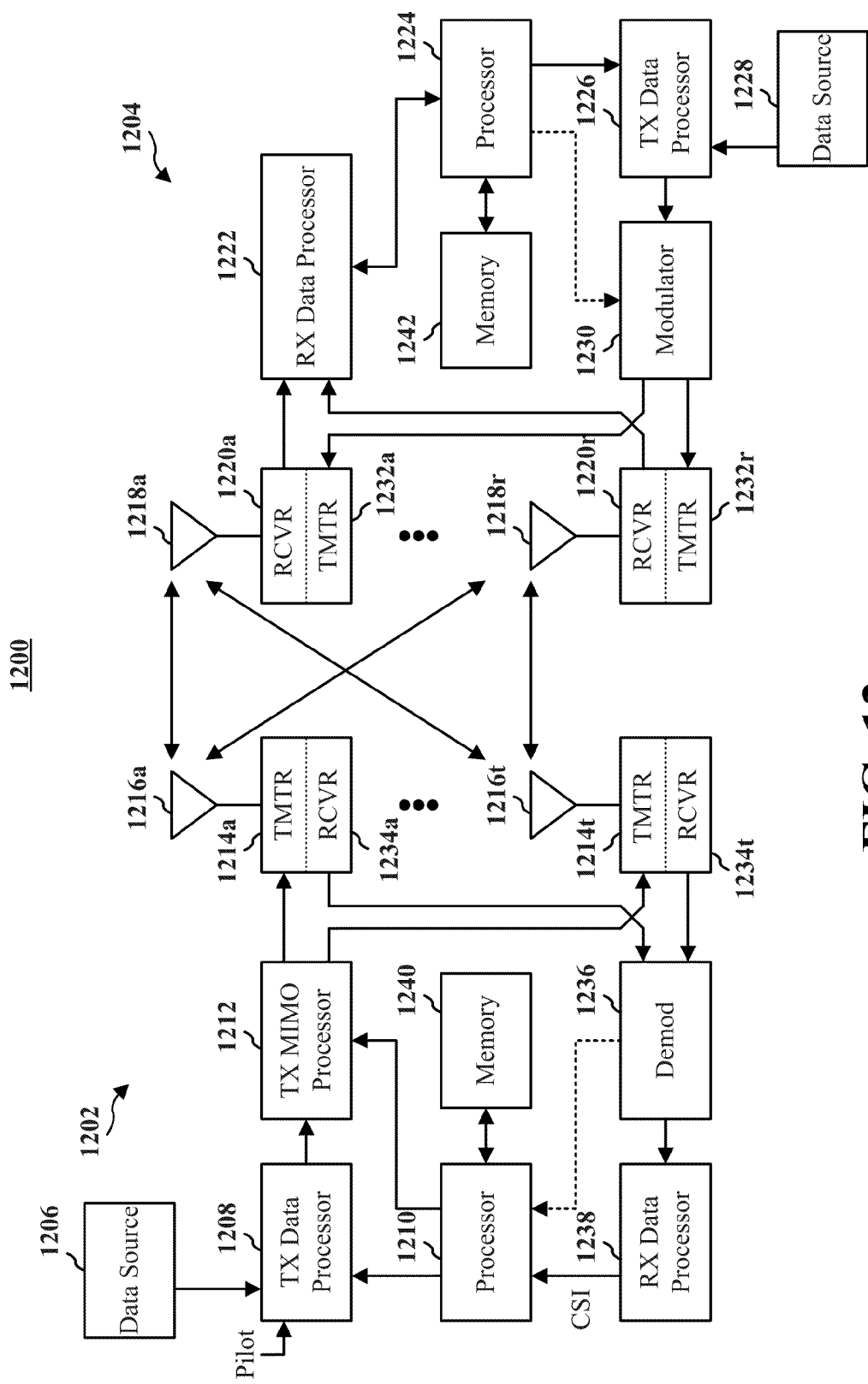
FIG. 12 illustrates an example wireless communication system, according to an aspect.

FIG. 12 illustrates an example wireless communication system 1200, according to an aspect. The wireless communication system 1200 depicts one base station 1202 and one mobile device 1204 for sake of brevity. However, it is to be appreciated that wireless communication system 1200 can include more than one base station and/or more than one mobile device, wherein additional base stations and/or mobile devices can be substantially similar or different from example base station 1202 and mobile device 1204 described below. In addition, it is to be appreciated that base station 1202 and/or mobile device 1204 can employ the systems and/or methods described herein to facilitate wireless communication there between.

At base station 1202, traffic data for a number of data streams is provided from a data source 1206 to a transmit (TX) data processor 1208. According to an example, each data stream can be transmitted over a respective antenna. TX data processor 1208 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1204 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1210.

The modulation symbols for the data streams can be provided to a TX MIMO processor 1212, which can further process the modulation symbols (e.g., for OFDM). TX MIMO processor 1212 then provides NT modulation symbol streams to NT transmitters (TMTR) 1214*a* through 1214*t*. In various embodiments, TX MIMO processor 1212 applies beamforming weights to the symbols of the data streams and to the antenna from which the symbol is being transmitted.

Each transmitter 1214 receives and processes a respective symbol stream to provide one or more analog signals, and further conditions (e.g., amplifies, filters, and upconverts) the analog signals to provide a modulated signal suitable for transmission over the MIMO channel. Further, NT modulated signals from transmitters 1214*a* through 1214*t* are transmitted from NT antennas 1216*a* through 1216*t*, respectively.

At mobile device 1204, the transmitted modulated signals are received by NR antennas 1218*a* through 1218*r* and the received signal from each antenna 1218 is provided to a respective receiver (RCVR) 1220*a* through 1220*r*. Each receiver 1220 conditions (e.g., filters, amplifies, and downconverts) a respective signal, digitizes the conditioned signal to provide samples, and further processes the samples to provide a corresponding "received" symbol stream.

An RX data processor 1222 can receive and process the NR received symbol streams from NR receivers 1220 based on a particular receiver processing technique to provide NT "detected" symbol streams. RX data processor 1222 can demodulate, deinterleave, and decode each detected symbol stream to recover the traffic data for the data stream. The processing by RX data processor 1222 is complementary to that performed by TX MIMO processor 1212 and TX data processor 1208 at base station 1202.

A processor 1224 can periodically determine which precoding matrix to utilize as discussed above. Further, processor 1224 can formulate a reverse link message comprising a matrix index portion and a rank value portion.

The reverse link message can comprise various types of information regarding the communication link and/or the received data stream. The reverse link message can be processed by a TX data processor 1226, which also receives traffic data for a number of data streams from a data source 1228, modulated by a modulator 1230, conditioned by transmitters 1232*a* through 1232*r*, and transmitted back to base station 1202.

At base station 1202, the modulated signals from mobile device 1204 are received by antennas 1216, conditioned by receivers 1234*a* though 1234*t*, demodulated by a demodulator 1236, and processed by a RX data processor 1238 to extract the reverse link message transmitted by mobile device 1204. Further, processor 1210 can process the extracted message to determine which precoding matrix to use for determining the beamforming weights.

Processors 1210 and 1224 can direct (e.g., control, coordinate, manage, etc.) operation at base station 1202 and mobile device 1204, respectively. Respective processors 1210 and 1224 can be associated with memory 1240 and 1242 that store program codes and data. Processors 1210 and 1224 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

It is to be understood that aspects described herein may be implemented by hardware, software, firmware or any combination thereof. When implemented in software, functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Various illustrative logics, logical blocks, modules, and circuits described in connection with aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor may be a microprocessor, but, in the alternative, processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described herein.

For a software implementation, techniques described herein may be implemented with modules (e.g., procedures, functions, and so on) that perform functions described herein. Software codes may be stored in memory units and executed by processors. Memory unit may be implemented within processor or external to processor, in which case memory unit can be communicatively coupled to processor through various means as is known in the art. Further, at least one processor may include one or more modules operable to perform functions described herein.

Techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. Further, CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on downlink and SC-FDMA on uplink. UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform functions described herein.

Further, the steps and/or actions of a method or algorithm described in connection with aspects disclosed herein may be embodied directly in hardware, in a software module executed by a processor, or a combination thereof. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to processor, such that processor can read information from, and write information to, storage medium. In the alternative, storage medium may be integral to processor. Further, in some aspects, processor and storage medium may reside in an ASIC. Additionally, ASIC may reside in a user terminal. In the alternative, processor and storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

While the foregoing disclosure discusses illustrative aspects and/or embodiments, it should be noted that various changes and modifications could be made herein without departing from the scope of described aspects and/or embodiments as defined by the appended claims. Accordingly, described aspects are intended to embrace all such alterations, modifications and variations that fall within scope of appended claims. Furthermore, although elements of described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used in this application, the terms "component", "module", "system", and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. Components may communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a mobile device. A mobile device can also be called, and may contain some or all of the functionality of a system, subscriber unit, subscriber station, mobile station, mobile, wireless terminal, node, device, remote station, remote terminal, access terminal, user terminal, terminal, wireless communication device, wireless communication apparatus, user agent, user device, or user equipment (UE), and the like. A mobile device can be a cellular telephone, a cordless telephone, a Session Initiation Protocol (SIP) phone, a smart phone, a wireless local loop (WLL) station, a personal digital assistant (PDA), a laptop, a handheld communication device, a handheld computing device, a satellite radio, a wireless modem card and/or another processing device for communicating over a wireless system. Moreover, various aspects are described herein in connection with a base station. A base station may be utilized for communicating with wireless terminal(s) and can also be called, and may contain some or all of the functionality of, an access point, node, Node B, e-NodeB, e-NB, or some other network entity.

Various aspects or features will be presented in terms of systems that may include a number of devices, components, modules, and the like. It is to be understood and appreciated that various systems may include additional devices, components, modules, and so forth, and/or may not include all devices, components, modules, and so on, discussed in connection with the figures. A combination of these approaches may also be used.

Additionally, in the subject description, the word "exemplary" (and variants thereof) is used to mean serving as an example, instance, or illustration. Any aspect or design described herein as "exemplary" is not necessarily to be construed as preferred or advantageous over other aspects or designs. Rather, use of the word "exemplary" is intended to present concepts in a concrete manner.

What is claimed is:

1. A method for inter-device handoff, comprising:
    determining a communication with a wireless wide area network (WWAN) is to be handed off from a first communications device, wherein the communication terminates or originates at the first communications device;
    selecting a second communications device from a plurality of communications devices to which the communication is to be handed off;
    observing a synchronization period phase;
    transferring information to the second communications device;
    using a common identity associated with the WWAN for both the first communications device and the second communications device; and
    handing off the communication to the second communications device,
    wherein the first communications device comprises a first WWAN modem and the second communications device comprises a second WWAN modem, and
    wherein one of the first WWAN modem or the second WWAN modem is used for the communication with the WWAN, wherein the WWAN does not assist with the handing off.

2. The method of claim 1, wherein the WWAN is aware of the handing off.

3. The method of claim 1, wherein the WWAN is unaware of the handing off.

4. The method of claim 1, further comprising:
    receiving an indication that the communication is to be transferred from the second communications device to the first communications device;
    exchanging information related to the handoff from the second communications device; and
    continuing the communication handed off from the second communications device.

5. The method of claim 1, wherein the communication is a two-way communication facilitated by the first communications device or the second communications device.

6. The method of claim 5, wherein a device that does not facilitate the communication is receiving the communication.

7. The method of claim 1, wherein the common identity is a shared among the plurality of communications devices.

8. The method of claim 1, wherein the common identity is associated with the first communications device and shared with the second communications device.

9. The method of claim 1, wherein the common identity is associated with the second communications device and shared with the first communications device.

10. The method of claim 1, wherein the common identity is a software identity.

11. The method of claim 1, wherein the observing further comprises at least one of:
    suspending a network communication; or
    inactivating at least one of a wireless wide area network radio and a protocol stack.

12. The method of claim 1, wherein the transferring information further comprises:
    transferring at least one of bearer information, temporary mobile subscriber identity information, session encryption keys, packet processing state information, timing information, system information blocks, an identity of the first communications device, information regarding one or more base stations with which to communicate, wireless technology to utilize for the communication, wireless channel frequency band for the communication, time slots for the communication with base stations, Orthogonal Frequency Division Multiple Access time-frequency resource blocks, preferred roaming lists, frequency offset information for synchronization, timing skew differential for synchronization, primary synchronization codes, secondary synchronization codes, packet data protocol context information, transport control protocol information, Transmission Control Protocol or User Datagram Protocol socket information, applications being executed, application state information, application data, encryption keys associated with applications, or combinations thereof.

13. The method of claim 1, wherein the determining further comprises at least one of estimating an energy consumption mitigation of the first communications device, estimating a direct link connection strength, estimating an amount of energy consumed by the first communications device to communicate over a direct link, or combinations thereof.

14. The method of claim 1, wherein the selecting further comprises at least one of estimating an energy level of each communications device of the plurality of communications devices, estimating an amount of energy consumed by each communications device of the plurality of communications devices to communicate over respective indirect links, estimating a connection strength for each indirect link, or combinations thereof.

15. The method of claim 1, further comprising:
retaining at least one of radio resource control signaling or non-access stratum signaling on the first communications device.

16. The method of claim 1, further comprising:
performing timing synchronization between the first communications device and the second communications device using a common signal associated with the WWAN.

17. The method of claim 1, further comprising:
supporting a wireless wide area network sniffing mode after the handing off; and
monitoring wireless wide area network receive signal information.

18. The method of claim 1, further comprising:
maintaining a wireless wide area network dormant mode after the handing off; and
receiving periodic quasi-static updates of wireless wide area network receive protocol state information and wireless wide area network transmit protocol state information.

19. The method of claim 1, further comprising:
sustaining a wireless wide area network sleeping mode after the handing off.

20. The method of claim 19, wherein the selecting comprises selecting the second communications device from the plurality of communications devices that are within a wireless or wired short-range peer-to-peer link.

21. The method of claim 1, further comprising:
performing a state transfer during the synchronization period phase.

22. The method of claim 1, further comprising:
starting a timer after the selecting, wherein the timer has a duration that is less than a network call drop time;
identifying an expiration of the timer; and
resuming the communication, wherein the communication is not successfully handed off to the second communications device.

23. The method of claim 1, further comprising:
conveying an identity of the first communications device to the second communications device, wherein the first communications device initiated the communication; and
releasing the communication, wherein the second communications device utilizes the identity of the first communications device to continue the communication over a network.

24. The method of claim 1, wherein the handing off comprises handing off at least one of a voice call, a data call, or an application without assistance from the WWAN.

25. A wireless communications apparatus, comprising:
a memory that retains instructions related to:
deciding to transfer a communication with a wireless wide area network (WWAN) to a selected node, wherein the communication terminates or originates at the wireless communications apparatus;
conveying information to the selected node during a synchronization period; and
attempting a handoff of at least one function to the selected node,
wherein the selected node comprises a WWAN modem for the communication with the WWAN, and
wherein a common identity is used by both the selected node and the wireless communications apparatus to communicate with the WWAN, which does not assist with the handoff; and
a processor, coupled to the memory, configured to execute the instructions retained in the memory.

26. The wireless communications apparatus of claim 25, the memory retains further instructions related to suspending the communication with the WWAN during the synchronization period.

27. The wireless communications apparatus of claim 26, the memory retains further instructions related to starting a timer before the conveying and resuming the communication with the WWAN if the timer expires before completion of the handoff, wherein a value of the timer is less than a network call drop time value.

28. The wireless communications apparatus of claim 25, the memory retains further instructions related to maintaining a WWAN sniffing mode if the handoff is successful, wherein the WWAN sniffing mode comprises monitoring WWAN receive signal information.

29. The wireless communications apparatus of claim 25, the memory retains further instructions related to maintaining a WWAN dormant mode if the handoff is successful, wherein the WWAN dormant mode comprises receiving periodic quasi-static updates of WWAN receive protocol state information and WWAN transmit protocol state information.

30. The wireless communications apparatus of claim 25, the memory retains further instructions related to maintaining a WWAN sleeping mode if the handoff is successful, wherein the WWAN sleeping mode comprises inactivating at least one of a WWAN radio and a protocol stack.

31. The wireless communications apparatus of claim 25, the memory retains further instructions related to receiving a notification that the communication is to be handed off from the selected node, exchanging information related to the communication from the selected node, and continuing the communication handed off from the selected node.

32. A wireless communications apparatus that performs a network unassisted inter-device handoff, comprising:
means for deciding to transfer at least one function to a node that comprises a wireless wide area network (WWAN) modem for communication with a WWAN;

means for selecting the node for the transfer;

means for transferring to the node common identity information and information related to the at least one function, wherein the common identity information is used by both the wireless communications apparatus and the node to communicate with the WWAN; and means for determining the at least one function is successfully handed off to the node, wherein the WWAN does not assist with the handoff.

33. The wireless communications apparatus of claim 32, further comprising:

means for starting a timer after the means for deciding determines the at least one function is to be transferred; and means for discontinuing the transfer if the timer expires before the at least one function is successfully handed off to the node.

34. The wireless communications apparatus of claim 32, further comprising:

means for suspending a network communication; and means for resuming the network communication if the at least one function is not successfully handed off to the node.

35. A computer program product, comprising:

a non-transitory computer-readable medium comprising:

a first set of codes for causing a computer to decide to transfer a network communication with a wireless wide area network (WWAN), wherein the network communication terminates or originates at the computer;

a second set of codes for causing the computer to select a node for a communication transfer, wherein the node comprises a wireless wide area network modem configured to communicate with the WWAN;

a third set of codes for causing the computer to discontinue the network communication;

a fourth set of codes for causing the computer to convey information to the node, wherein the information comprises at least a common identity used by both the computer and the node to communicate with the WWAN; and a fifth set of codes for causing the computer to release the network communication to the node, wherein the network communication is released without assistance from the WWAN.

36. The computer program product of claim 35, the non-transitory computer-readable medium further comprising:

a sixth set of codes for causing the computer to monitor a time between discontinuing the network communication and the release of the network communication to the node; and a seventh set of codes for causing the computer to discontinue the transfer if the time is longer than a portion of a network call drop time.

37. An apparatus configured to perform a network unassisted communication handoff, comprising:

a first module configured to determine a communication with a wireless wide area network (WWAN) is to be handed off, wherein the communication terminates or originates at the apparatus;

a second module configured to select a node from a plurality of nodes to which the communication is to be handed off, wherein the node comprises a WWAN modem used for communications with the WWAN;

a third module that starts a timer that has a duration that is less than a network call drop time;

a fourth module configured to observe a silence period phase;

a fifth module configured to transfer information to the node;

a sixth module configured to hand off the communication to the node, wherein the WWAN does not assist with the handoff, and wherein the silence period phase continues until expiration of the timer or until the communication is successfully handed off to the node.

38. The at least one processor of claim 37, further comprising a seventh module configured to observe one of a WWAN sniffing mode, a WWAN dormant mode, or a WWAN sleeping mode after the communication is successfully handed off to the node.

* * * * *